United States Patent
Ruther et al.

(10) Patent No.: US 10,944,129 B2
(45) Date of Patent: Mar. 9, 2021

(54) CONDUCTING POLYMERS

(71) Applicant: Commonwealth Scientific and Industrial Research Organisation, Acton (AU)

(72) Inventors: Thomas Ruther, Campbell (AU); Jean-Pierre Veder, Campbell (AU); Mike Horne, Campbell (AU); Paulo De Souza, Campbell (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 59 days.

(21) Appl. No.: 16/073,401

(22) PCT Filed: Jan. 27, 2017

(86) PCT No.: PCT/AU2017/050060
§ 371 (c)(1),
(2) Date: Jul. 27, 2018

(87) PCT Pub. No.: WO2017/127890
PCT Pub. Date: Aug. 3, 2017

(65) Prior Publication Data
US 2019/0067738 A1    Feb. 28, 2019

(30) Foreign Application Priority Data

Jan. 29, 2016    (AU) ................................ 2016900282

(51) Int. Cl.
*H01M 10/0565*    (2010.01)
*H01M 2/14*    (2006.01)
(Continued)

(52) U.S. Cl.
CPC ........... *H01M 10/0565* (2013.01); *C08F 2/58* (2013.01); *H01M 2/145* (2013.01); *H01M 2/1653* (2013.01); *H01M 2/1686* (2013.01); *H01M 10/0525* (2013.01); *C08F 220/44* (2013.01); *C08F 222/102* (2020.02); *C08F 226/06* (2013.01); *C08F 228/06* (2013.01);
(Continued)

(58) Field of Classification Search
None
See application file for complete search history.

(56) References Cited

U.S. PATENT DOCUMENTS

2009/0020431 A1*    1/2009    Voccia ................ B81C 1/00206
205/77
2011/0211295 A1    9/2011    Ueda et al.

FOREIGN PATENT DOCUMENTS

JP    2011-181611    9/2011

OTHER PUBLICATIONS

Rymarczyk et al., European Polymer Journal, 44 (2008), 2153-2161. (Year: 2008).*

(Continued)

*Primary Examiner* — Eli S Mekhlin
(74) *Attorney, Agent, or Firm* — Brinks Gilson & Lione

(57) ABSTRACT

There is described a process for forming a conformal film of conducting polymer onto one or more surfaces of a substrate by polymerising onto the one or more surfaces in a single step one or more conducting polymer precursors including one or more monomers in the presence of conductivity enhancing additives comprising one or more ionic liquids and one or more optional ionic dopants.

22 Claims, 8 Drawing Sheets

(51) Int. Cl.
  H01M 2/16 (2006.01)
  C08F 2/58 (2006.01)
  H01M 10/0525 (2010.01)
  *C08F 220/44* (2006.01)
  *C08F 226/06* (2006.01)
  *C08F 228/06* (2006.01)
  *C08F 222/10* (2006.01)

(52) U.S. Cl.
  CPC .............. *H01M 2300/0045* (2013.01); *H01M 2300/0082* (2013.01); *H01M 2300/0085* (2013.01)

(56) References Cited

OTHER PUBLICATIONS

Author Unknown, Sigma-Aldrich, 900873—1-Butyl-1-methylpyrrolidinium bis(trifluoromethylsulfonyl)imide Data Sheet, 2020. (Year: 2020).*
Arjomandi, Jalal et al. "Enhanced Electrical Conductivity of Polyindole Prepared by Electrochemical Polymerization of Indole in Ionic Liquids," Journal of Applied Polymer Science 131, 8, 2014, p. 40094 (5 pages).
Kim, Guk-Tae, et al. "Solvent-Free, PYR 1A TFSI Ionic Liquid-Based Ternary Polymer Electrolyte Systems: I. Electrochemical Characterization," Journal of Power Sources, 171, 2007, pp. 861-869.
B. Sun et al.: "Electrodeposition of Thin Poly(Propylene Glycol) Acrylate Electrolytes on 3D-Nanopillar Electrodes" Electrochimica Acta, 137, 2014, pp. 320-327.
Sungwon Lee et al.: "Electropolymerization of a Bifunctional Ionic Liquid Monomer Yields an Electroactive Liquid-Crystalline Polymer," Adv. Funct. Mater., 20, 2010, pp. 2063-2070.
Eun-Ah Song et al.: "Structural Analysis of Conductive Polypyrroles Synthesized in an Ionic Liquid," Bull. Korean Chem. Soc., vol. 30, No. 5, 2009, pp. 1009-1011.
Shalu, Varun Kumar Singh et al.: "Development of Ion Conducting Polymer Gel Electrolyte Membranes Based on Polymer Poly(Vinylidene Fluoride-Co-Hexafluoropropylene), 1-Butyl-3-Methylimidazolium Bis Trifluoromethanesulfonyl)Imide) Ionic Liquid and Li-Salt with Improved Electrical Thermal and Structural Properties," Journal of Materials Chemistry C, 3, Jun. 2015, pp. 7305-7318.
Australian Patent Office, Woden ACT, Australia, International Search Report of International Application No. PCT/AU2017/050060, dated Apr. 26, 2017, 4 pages.
Extended European Search Report for corresponding PCT International Application No. PCT/AU2017/050060, dated May 16, 2019.
Graeme A. Snook et al, "Co-deposition of conducting polymers in a room temperature ionic liquid," J. Mater. Chem., 2009, 19, 4248-4254.
Japanese language version of: Japanese Office Action, dated Oct. 26, 2020, for corresponding Japanese application no. 2018-539408,.
English translation: Japanese Office Action, dated Oct. 26, 2020, for corresponding Japanese application no. 2018-539408,.

* cited by examiner

CONDUCTING POLYMERS

CROSS-REFERENCE TO RELATED APPLICATIONS

This application is the National Stage of International Application Serial No. PCT/AU2017/050060 filed on Jan. 27, 2017 with the Australian Patent Office and published in English, which claims priority from Australian Provisional Patent Application No. 2016900282 filed Jan. 29, 2016, wherein the entire content of each of the aforementioned applications are hereby incorporated herein by reference.

FIELD OF THE INVENTION

The invention relates to conducting polymers and applications thereof, as well as methods of preparing same. In particular, the invention relates to use of such polymers as solid polymer electrolytes in energy storage devices or as surfaces in sensors, microelectronics, membranes, or in biomedical applications.

BACKGROUND

Electroactive polymers are used in several different electrochemical systems, such as batteries, electrocatalytic materials, sensor devices, etc. Additionally, they can be used in inorganic electronic devices, for example, in light emitting diodes (OLEDs), field transistors (OFETs), and solar cells (OSCs). They can also be used in biomedical applications as functional coatings for example.

Electroactive polymers are particularly useful as electrolytes in 3D microbatteries (3DMBs) which comprise high surface areas of 3D-structured active materials and excellent energy storage capacities per volume compared to planar battery arrangements. 3DMBs are particularly suited to small scale electronic devices, such as microsensors and micro-electromechanical systems, where limited available space means battery size is critical.

Like conventional batteries, 3DMBs are comprised of five components: positive current collector, cathode, electrolyte, anode and negative current collector. However, in contrast to the planar electrode configuration of conventional batteries, 3DMBs consist of a 3-D arrangement of the battery materials. A 3D-structured current collector or inert substrate is used as a scaffold, upon which the remaining battery components are coated in a conformal manner. This configuration is known as a 'stacked' design due to the stacked arrangement of the materials. However, other variants incorporate the positive and negative electrode materials on a common inert substrate (side-by-side arrangement).

In an energy storage device, the electrolyte layer forms the medium between the positive and negative electrode materials that facilitates the ion movement between electrodes that enables current flow. Ion movement or transport is an important mechanism of current flow and is determined by the ionic conductivity of the electrolyte material. A high ionic conductivity gives a measure of the ease of ion movement from one site to another through a liquid or solid electrolyte and thus is indicative of a material's ability to transport ions. In general, increasing ion concentration in an electrolyte tends to increase conductivity.

In conventional batteries, the electrolyte typically exists as a liquid soaked into a thin separator material that provides a physical separation barrier between the electrode materials. However, in 3DMBs, solid polymer electrolytes (SPEs) are preferred as they function as both a separator and an electrolyte allowing for ease of assembly and operation, as well as allowing a reduction in battery size. Furthermore, liquid-free battery systems are desirable as they are not associated with electrolyte leakage.

To ensure acceptable performance, there are a number of key requirements for an SPE. Firstly, the SPE must be in the form of a thin coating to allow minimal separation between positive and negative electrode materials to ensure short ion-diffusion pathways between electrodes. The coating should be a conformal coating to avoid 3D structure flooding and loss of the benefits offered by the 3D electrode architecture. Pinhole or defect free, mechanically stable and electrically insulating SPEs are essential to avoid short circuits during microbattery assembly and operation. The SPE must be sufficiently ionically conducting to ensure sufficient ion migration between the electrode materials. Finally, the SPE material must be chemically compatible with other active components in the system. The coating must be mechanically robust enough not to degrade in the battery operating voltage window, nor to crack or break apart under the mechanical stresses formed during battery cycling. However, in practice, conformal deposition of strong, thin, highly ion conducting, yet defect free coatings over large surface areas directly onto 3-D architecture has proven challenging.

Pure polymers generally lack sufficient ionic conductivity to function effectively as a conducting electrolyte. Ionic dopants are therefore incorporated in the polymer matrix to enhance the ionic conductivity of the polymer. Conventional polymerisation techniques readily achieve this goal by bulk polymerisation of a solution of monomer and ionic dopant such that the ionic dopants become entrained in the polymeric matrix on polymerisation. Further ionic conductivity enhancement has been achieved by plasticising the polymer by using a mixture of two polymers having different properties as polymer feedstock or by adding a plasticiser component when forming the polymer. Plasticising the polymer increases the plasticity or fluidity of the material allowing better ion movement, as well making the material more flexible and durable. Small amounts of ionic liquids have been used as polymer plasticisers and simultaneously provide a convenient source of additional ions which contribute favourable to ionic conductivity enhancement.

At least one lithium-ion battery SPE has been fabricated by combining a chemically inert, electrically insulating polymer with one or more conductivity performance enhancing components, for example, lithium bis[trifluoromethane]sulfonimide (LiTFSI). The salt may be included in amounts of from 0.1 up to 3 mol per kg monomer/IL mixture, until maximum conductivity is achieved and the amount is at or below the maximum solubility of the salt in the mix. The doped lithium salt dissolves into the polymer blend to provide a lithium-ion reserve in the electrolyte that facilitates lithium-ion migration between the positive and negative electrode materials.

While solution casting, UV-initiated polymerisation and solution casting methods have been used to manufacture SPEs, these bulk polymerisation methods flood the 3D substructure negating the advantageous properties offered by a high surface-area electrode configuration. Furthermore, conventional methods such as solution casting or mechanical application of pre-fabricated polymers are not suitable for the conformal and thin coating of complex electrode architectures.

Electrosynthetic methods, which involve formation of chemical compounds in an electrochemical cell, are better suited to the reproducible fabrication of thin and conformal SPE coatings on electrically conductive surfaces. Furthermore, electrosynthetic methods result in high purity polymers and require less energy than chemical synthetic methods. In particular, electropolymerisation and electrografting have been used to form thin and conformal polymer electrolytes having thicknesses of down to about 10 nm.

Electropolymerisation of monomers is rarely initiated absent a separate initiator source, for example, H., $O_2$. radicals, diazo compounds, etc. Such initiators may be required if the electrochemical potential at which radical generation occurs is not compatible with a particular application. It is believed that when a radical initiator source is present, polymerisation of the respective monomers occurs in the bulk solution through radicals generated from the solvent or a radial initiator source, such as AIBN, peroxides, etc., rather than via polymerisation of the monomer at the surface. In bulk polymerisation processes, the polymer may exhibit poor adhesion to the substrate.

In contrast, electrografting is a surface-bound electrosynthetic deposition approach, which is particularly desirable for SPE formation since it adheres conformal films of polymer to a suitably polarised surface with self-limiting growth such that the thickness of the resultant polymer films is typically between about 50-100 nm. Electrografting is conventionally carried out in solutions consisting of monomer and a supporting electrolyte a conventional organic solvent, typically a polar or non polar solvent, or aqueous medium. The organic or aqueous solvent serves as a reaction media/diluent for delivering monomer to the polarised electrode thereby allowing surface grafting to take place. However, during electrografting, as polymerisation does not extend into the bulk solution, only a thin film of polymer (nm to micron thickness) is deposited, as only a small amount of the monomer solution can be polymerised at the electrode surface. The small amounts of monomer at the surface mean that it is difficult to sufficiently entrain ionic dopants in the polymer matrix during formation. Thus, whilst it is theoretically possible for ionic dopants to be entrained in the surface-bound polymer, it is difficult to add ionic dopants in the sufficient concentrations required to ensure incorporation without having a detrimental effect on the electrografting process. Furthermore, charge transfer through a SPE is not as efficient as that in liquid electrolytes due to much reduced ion permeability and thus ion mobility that results from the polymeric structure of the SPE. Thus, post-treatment incorporation of plasticising/conductivity enhancing components into the SPE is essential to boost the conductivity to acceptable performance levels. For at least these reasons, to date, many electrosynthesised SPEs have undesirably low ionic conductivities compared to liquid electrolytes. Furthermore, before the film can be used as a polymer electrolyte, the solvent and the supporting electrolyte must be completely removed from the composite material, for example, by a post fabrication solvent removal step, for example, evaporation, leading to slower and more costly fabrication process. Thus, the organic solvents used tend to have low vapour pressures to ensure easy of evaporation.

Electrografting in ionic liquid diluents has been carried out for non-battery related applications where surface functionalisation of, for example, glassy carbon and graphene sheets, with organics is required. Functionalised diazonium salts are used as the grafting agents whereby diazonium reduction is necessary to facilitate covalent bonding of an organic component to a material surface. However, such components add to the process costs and may negatively interfere with battery operation. Furthermore, the ionic liquid is only intended as a reaction medium and any incorporation of ionic liquid on the modified surface is an undesirable consequence of this process.

Ionic liquids have been used extensively in bulk polymers as conductivity enhancers and plasticisers but have not been readily used as conductivity enhancing diluents and dopants during the fabrication of surface-bound conformal films of polymers.

Therefore, an object of a preferred embodiment of the invention is the provision of improved fabrication methods for SPE formation capable of being carried out conveniently, and quickly and without need for use of non-ionic liquid solvents and supporting electrolyte, yet capable of producing conducting polymers having high ionic conductivities that meet the above requirements for SPEs, particularly with respect to conformal and defect free coatings.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Statements of the Invention

In one aspect, the invention provides a process for forming a surface bound conformal film of ion conducting polymer onto one or more surfaces of a substrate wherein the polymer has conductivity enhancing additives entrained therein, the process comprising the step of:

forming and surface binding the polymer film by polymerising onto the one or more surfaces in a single step one or more conducting polymer precursors including one or more monomers in the presence of conductivity enhancing additives consisting essentially of one or more ionic liquids having a melting point below 100° C., wherein the one or more conducting polymer precursors are present in amounts that provide a substantially pinhole free polymer film having substantially all of the conductivity enhancing additives entrained therein.

In a related aspect, the invention provides a process for forming a surface bound conformal film of ion conducting polymer onto one or more surfaces of a substrate wherein the polymer has conductivity enhancing additives entrained therein, the process comprising the step of:

forming and surface binding the polymer film by polymerising onto the one or more surfaces in a single step one or more conducting polymer precursors including one or more monomers in the presence of conductivity enhancing additives comprising one or more ionic liquids having a melting point below 100° C., wherein the one or more conducting polymer precursors are free of non-ionic liquid solvent and are present in amounts that provide a substantially pinhole free polymer film having substantially all of the conductivity enhancing additives entrained therein.

In a further related aspect, the invention provides a process for forming a surface bound conformal film of ion conducting polymer onto one or more surfaces of a substrate wherein the polymer has conductivity enhancing additives entrained therein, the process comprising the step of:

forming and surface binding the polymer film by polymerising onto the one or more surfaces in a single step one or more conducting polymer precursors including one or more monomers in the presence of conductivity enhancing additives comprising one or more ionic liquids having a melting point below 100° C., wherein the one or more conducting polymer precursors are present in amounts that provide a substantially pinhole free polymer film having substantially all of the conductivity enhancing additives entrained therein, and wherein on formation on the surface the polymer film is free of polar or non polar ionic liquid solvent.

In another aspect, the invention provides a process for forming a conformal film of conducting polymer onto one or more surfaces of a substrate by polymerising onto the one or more surfaces in a single step one or more conducting polymer precursors including one or more monomers in the presence of conductivity enhancing additives comprising one or more ionic liquids and one or more optional ionic dopants, preferably metal salts. Preferably, the conducting polymer is an ion conducting polymer. This may be achieved by utilising conductivity enhancing additives which are ion conductivity enhancing additives.

In a preferred embodiment, the conductivity enhancing additives consist of one or more ionic liquids having a melting point below 100° C. In a further preferred embodiment, the conductivity enhancing additives consist of one or more ionic liquids having a melting point below 100° C. and one or more metal salts, preferably Li salts, such as LiTFSI.

Preferably, on formation, the conducting polymer is surface bound to the substrate.

In particular, an ionically conducting polymer is preferred. Preferably, the polymer of the invention has an ionic conductivity of at least $1\times10^{-5}$ S/cm at ambient temperature.

In a related aspect there is provided a product obtainable by the process of the invention.

Where the optional dopants, suitably metal salts, are not included as conductivity enhancing additives, it will be understood that the conductivity enhancing additive consist essentially of one or more ionic liquids.

Suitably, the polymer film forming step is a surface binding step whereby the polymer is deposited onto the surface through a surface bound deposition process that adheres the film/composite to the substrate.

Desirably, the polymer is deposited in the form of a conformal film or a conformal coat, preferably of substantially uniform thickness. It will be understood that in preferred embodiments, a substantially uniform thickness is one which does not deviate from the mean thickness by any more than ±10%, more preferably, by ±5%, more preferably, by ±2%, and most preferably, by ±1%.

Preferably, the polymer film forming step is carried out in a single step. By a 'single step', it is meant that all of the conducting polymer precursors and conductivity enhancing additives are simultaneously present at the substrate's surface when surface binding of the conformal polymer film onto the substrate surface take places. Suitably, the conducting polymer precursors and conductivity enhancing additives are provided to the surface in the form of a single (one) solution/mixture of the one or more conductivity enhancing additives. In other words, the conducting polymer precursors and the conductivity enhancing additives are simultaneously present at the surface when formation and surface binding of the polymer onto the surface occurs, and preferably are provided to the surface in the form of a single mixture. Such a mixture comprises the one or more monomers, the one or more ionic liquids, and the one or more optional ionic dopants, for example. Thus, the one step process of the invention is facilitated by providing all of the necessary conducting polymer components to the surface in a single step by providing a mixture suitable for surface binding of polymer to the substrate. Preferably, the single (one) solution is a mixture of components that consists essentially of: the one or more monomers, the one or more ionic liquids and the one or more optional ionic dopants. In one embodiment, the mixture is preferably a ternary mixture of conductivity enhancing additives, ionic liquid, monomer and ionic dopant.

Suitably, the polymer film is formed and surface bound to the surface through generation of an initiator radical ion on the surface which propagates polymer chain formation from conducting polymer precursors present at the surface. Typically, the initiator radical ion is generated at the surface from the one or more redox active (reducible or oxidisable) conducting polymer precursors, preferably on application of sufficient positive or negative electrical potential to the surface. It will be understood that the initiator radical ion is chemisorbed, covalently bound or grafted onto the activated surface on formation and remains so during polymer chain propagation. Desirably, the initiator radical ion is a radical cation or anion formed from a one electron redox process (oxidation or reduction depending on the potential applied), preferably reduction, involving monomer and/or other conducting polymer precursors present at the surface. Furthermore, iterative polymer chain propagation involving the conducting polymer precursors at the surface generates polymer of a desired thickness, determined by how long propagation is allowed to occur. Most preferably, generation of the initiator radical ion through a redox process at the surface occurs via electrografting, electropolymerisation or other electro process suitable for forming at, and surface binding a radical ion to, the surface.

Suitably, the conducting polymer is a homopolymer or a copolymer. By 'monomer', it is meant a molecule or relatively low molecular weight compound preferably of $M_{wt}$ from 200-1000, comprising one or more polymerisable functional groups, for example, acrylate groups terminating for example polyethylene glycol chains, such that the molecule is capable of reacting with other similar molecules to form a polymer having a significantly high molecular weight. It will be understood that a monomer or other suitably polymerisable species comprises at least one polymerisable functional group, such as an optionally substituted vinyl group or an optionally substituted acrylate group, for example. Within the context of the present invention, it is important to appreciate that oligomers, consisting of a few monomer units, for example, dimer, trimer, tetramers, etc., can be used in combination or in place of monomers. Furthermore, the one or more monomers may be the same or different so long as the monomers used are compatible with each other with respect to polymerisation. Where mixtures of various monomers are used, the desired monomers can be used in any desired ratio depending on the properties desired for the composite polymer. For example, a mixture of 2 or more different monomers or other suitable polymerisable species could be used. It will be understood that a homopolymer is formed when a single type of monomer is employed, while a copolymer, for example, a block or random type copolymer is formed where different monomers are used. Likewise, when one or more of the ionic liquids have suitable polymerisable groups are used in conjunction with one or more monomers according to the invention copolymers of the type comprising monomer and ionic liquid may be formed.

Thus, preferably, in addition to the one or more monomers, the one or more of the conductivity enhancing additives comprise at least one polymerisable functional group and/or one or more hydrophilic, hydrophobic, or other reactive groups, pH responsive groups, emissive, absorptive, fluorescent groups. Where present, irrespective of the component in question, the polymerisable functional group may be selected from the group consisting of acrylate, vinyl, styrene, acrylonitrile, olefin and/or other polymerisable groups which may be optionally substituted with groups such as alkyl groups, or one or more ionisable or cross linkable functional groups such as —COOH or —NH$_2$. Crosslinking and methods are well known in the art. In some embodiments, the monomer may be provided in the form of a blend or masterbatch which may be augmented with other useful components such as a catalyst for heterogeneous catalysis, a dye for coloration purposes or even photovoltaic applications. In these latter (non-battery) applications, the presence of a Li-salt dopant may not be required.

Preferably, the conducting polymer of the invention has an ionic conductivity of at least $1 \times 10^{-5}$ S/cm at ambient temperature, more preferably, at least $1 \times 10^{-4}$ S/cm, as determined for example by AC impedance spectroscopy.

Suitably, the ionic liquid conductivity enhancing additive used in the process of the invention is provided to the substrate surface at the same time as monomer and dopant (if required). It will therefore be understood that the ionic liquid concentration must be at a level to be miscible with the one or more monomers, and/or the optional one or more ionic dopants, when present. Thus, the ionic liquid:monomer concentration ratio is selected to be miscible with the one or more monomers, and/or the optional one or more ionic dopants, when present. However, the ionic liquid concentration must not be too great such that all of the ionic liquid used cannot be incorporated/entrained in the polymer on one-step formation due to the problematic phenomenon of a miscibility gap forming in the final polymer composite/film. In other words, the liquid:monomer concentration ratio is such that substantially all of the ionic liquid used in the process is incorporated/entrained in the polymer. At these concentrations, the ionic liquid is preferably fully incorporated into the conducting polymer composite material such that further clean up or purification steps are not required. In other words, substantially no excess ionic liquid remains at the end of the fabrication process. By fully incorporated or entrained, it is meant that at least 80%-100%, preferably 90-100%, and more preferably 95%-100% of the ionic liquid (and/or dopant) used becomes entrained within the polymer. Suitably, the ionic liquid:monomer concentration ratio is such that substantially all of the ionic liquid is incorporated/entrained in the polymer, wherein preferably, at least 80-90%, and more preferably 90%-100% of the ionic liquid is entrained within the polymer. Processing advantages include the avoidance of the need for an excess/unreacted IL removal step. Furthermore, as conventional non-ionic solvents are not used in the process, the formed polymer, immediately on formation, is substantially or more preferably completely free of conventional non-ionic solvent traces or residues. This is in contrast to a number of conducting polymer fabrication methods, where the amount of ionic liquid entrained as conductivity enhancer is substantially less. Additionally, as existing processes typically require an aqueous or organic solvent (a conventional non-ionic liquid solvent), clean up, solvent removal is required after fabrication. The optimum ratio of ionic liquid:monomer required to ensure full incorporation of the ionic liquid into the polymer is monomer dependent. In other words, the ratio is determined limited to by the type of monomer used. In some cases, certain monomers require an ionic liquid concentration of from 15-20 wt % before a miscibility gap occurs in the final polymer. This same is true for the dopant. Thus, for certain monomers, the ionic liquid may be present in the conducting polymer precursors in amounts of up to and including 40 wt %, more preferably 30 wt % of the total weight of the monomer and ionic liquid component. Thus in preferred embodiments, the conducting polymer formed comprises incorporated ionic liquid including and up to levels of 40 wt % based on the monomer present, more preferably including ionic liquid up to 35 wt % of the monomer present. For example, wherein the monomer is a diacrylate monomer, the ionic liquid concentration is up to 40 wt % (based on monomer) or wherein the monomer is a monoacrylate, the ionic liquid concentration is up to 20 wt % based on the total weight of the monomer and ionic liquid component. More preferably, wherein the monomer is a diacrylate or monoacrylate monomer, the ionic liquid proportion is up to 40 wt % (based on total amount of monomer and ionic liquid) provided.

'Binding', 'surface binding', 'surface bound' or 'surface bound deposition' means that the conducting polymer film adheres to the surface of the substrate to intimately contact same. Strong adherence at the surface/polymer interface is important where the polymer is used as a solid polymer electrolyte because good contact at the interface of electrolyte and surface is important to facilitate ion transport during battery operation, as well as for mechanical strength. In one embodiment, the polymer formed adheres to the one or more surfaces of the substrate, for example, by a physical or chemical process which strongly associates the polymer with the surface. For example, in one embodiment, the polymer may be surface bound to the substrate, for example, through chemisorption, covalent or other strong bonding between the polymer and the substrate surfaces. The manner of adhering or fixing of the polymer onto the surface depends on mechanism involved in polymerisation, and in particular, initiation of polymerisation, which preferably is a surface binding process, for example, a surface bound deposition process. Suitably, the polymer is covalently bonded or grafted onto to surface. The adhesion between the film and the surface is preferably such that the film resists peeling from the surfaces under conditions of repeated battery operation, particularly battery cycling.

On fabrication, the conducting polymer takes the form of a composite material whereby the conductivity enhancing additives are incorporated/entrained within the polymer network or form part of the polymer backbone where additives having polymerisable groups are included as precursors. It will be understood that the ionic properties of the polymer matrix are modified by the presence of the conductivity enhancing additives. The amount of conductivity enhancing additive included influences the ion conducting properties of the composite polymer greatly. The degree of ion incorporation can be determined by a surface or compositional analysis technique, such as XPS analysis of the film when formed on the surface for example.

Desirably, the conducting polymer formed is in solid or gel polymer form. However, solid polymers are preferred as they function as the separator in the battery. Good separation is more difficult to achieve with a gel. In particular, a solid ionically conducting polymer is preferred. By 'substrate', it is meant all of, or at least a portion of a surface, suitably being a conductive surface, such as an electrically conducting surface or other surface that allows transport of electrons from an applied potential source to one or more polymerisable species present when they contact the surface. It follows that the surface forms part of a polarisable substrate which is capable of holding a charge when a suitable potential is applied thereto. For example, the conducting polymer may be surface bound to the substrate by polymerisation initiation on a polarised surface to which potential is applied via an electrografting process.

Most preferably, the substrate is polarisable surface which holds a positive or negative charge after suitable potential is applied, such as a positive or negative electrode, for example, as used in an energy storage devices including batteries and capacitors. Desirably, the surface is a polarisable substrate capable of holding a charge when a suitable potential is applied thereto, preferably a metal, a metal alloy, a semi-conductor, an electrode or a material typically used in energy storage device including batteries and capacitors, an electronically conducting polymer, such as polyaniline, polyacrylonitrile, polythiophene, polypyrrole, or derivatives thereof. Thus, in polymer electrode fabrication processes, the substrate can be a cathode or an anode depending on the nature of the starting electrode. Desirably, the substrate is selected from the group consisting of: a metal, for example, an elemental metal including gold, platinum, lithium, sodium, magnesium, aluminium and tin, or an metal alloy, for example, Cu/Sn, Li/Mg, or Mg/Si; a semi-conductor, such as n- or p-doped silicon; an electrode or a material typically used in energy storage devices, such as batteries and capacitors, for example, glassy carbon, graphite, Si; Si/C; typical electrode materials including lithium iron phosphate, lithium manganese oxide, lithium nickel manganese oxide, lithium nickel cobalt manganese oxide; an electronically conducting polymer, such as polyaniline, polyacrylonitrile, polythiophene, polypyrrole, or derivatives thereof. The substrate can also be of a material containing one or more electronically conducting additional materials, wherein the electronically conducting additional materials are present in amounts that allow for sufficient electronic conduction. Combinations of the above materials are also envisaged. Suitably, the substrate or one or more portions of the substrate, or surfaces thereof, can be formed from one or more of these materials, or can be coated or partially coated with one or more of these materials.

A 'conformal' film or coating means a thin layer of polymer which 'conforms' to the contours of the surface of the body onto which the polymer is formed. Suitably, the film or coating is provided in a form that is applied to a surface with a thickness that is substantially the same everywhere along the interface between the surface and the film. It will be understood that in preferred embodiments, a substantially uniform thickness is one which does not deviate from the mean thickness by any more than ±10%, more preferably, by ±5%, more preferably, by ±2%, and most preferably, by ±1%. The average thickness may be determined by suitable surface characterisation techniques, for example, atomic force microscopy.

Suitably, the film or coating formed is substantially defect free, meaning that the film or coating is substantially pin-hole free. By 'pin-hole free', it is meant that the film is contiguous and several nanometers to about one hundred nanometers thick and the diameter of any pores within the film are smaller than the thickness of the film. In particular, a substantially pinhole free film is one having a substantially uniform thickness not deviating from film mean thickness by more than ±10%. Also, pinhole free can be understood in terms of electrical integrity so that the film acts as a separator membrane entirely over the electrode surface and hence prevents short circuiting as a result from two electrodes getting into contact. A pin-hole free surface is particularly important in the case of a solid polymer electrolyte to avoid short circuits when assembling or operating an energy storage device comprising the material.

Preferably, the conducting polymer formed on the substrate surface is an ionically conductive polymer. The ionically conductive polymer functions as a solid polymer electrolyte when used in an energy storage device, particularly when a suitable dopant is entrained therein. Thus, it will be appreciated that 'solid conducting polymer' and 'solid polymer electrolyte' as used herein, are equivalent and interchangeable terms depending on the application in question. For example, where the conducting polymer is used as a solid polymer electrolyte in an energy storage device including a battery, the solid polymer of the invention is more accurately described as a solid polymer electrolyte. A 'solid polymer electrolyte' is a composite material comprising a polymeric matrix in which ion generating substances, or ionic dopants are provided. Electrical potential applied across the solid polymer electrolyte facilitates charge transport through higher ion movement/transport levels throughout the polymer matrix. By 'ionically conductive' or 'ion conducting', etc., it is meant that the polymer film is capable of conducting and/or transporting charge between two electrodes in the form of ions throughout the polymer material. Pure polymers tend to be weak ion conductors. However, the inventors have found that use of sufficient ionic liquids to monomer ratios, as well as optional one or more ionic dopants during polymer formation results in the polarisable surface being saturated with ionic liquid molecules such that on one-step polymer formation, a significant amount, and preferably, substantially all of the ionic liquid provided becomes incorporated into/entrained within or associated with the polymer.

Incorporation of such significant amounts of ionic liquid into the polymer as a conductivity enhancer preferably provides a significant increase in ionic conductivity compared to the corresponding pure polymer analogue, most preferably, an increase in ion conductivity of several orders of magnitude. As mentioned above, the conducting polymer of the invention has an ionic conductivity of at least $1 \times 10^{-5}$ S/cm, and preferably, $1 \times 10^{-4}$ S/cm. Critically, the excellent ionic conductivities are achievable directly via one step fabrication of the composite polymer without the need for further supplementation/incorporation of supplemental conductivity enhancing additives into the polymer matrix post fabrication and without the use of conventional solvents, such as polar or non-polar non-ionic solvents during the one step fabrications process, traces of which typically remain with the polymer matrix.

Prior to initiation of polymerisation, the one or more substrate surfaces may be modified and/or activated to facilitate the formation of the conducting polymer of the invention onto the one or more surfaces of a substrate from the one or more solid polymer precursors. By 'activated surface' or 'activating the surface', it is meant that the surface is modified or adapted in a way that promotes polymer and/or film surface binding and/or conformal adherence of the polymer film to the surface. In one embodiment, the surface may be activated by polarising the surface to hold a charge, for example, by application of a suitable electrical potential. Preferably, the potential applied is an electrical potential that is applied using an electrografting or other electrosynthetic process capable of surface binding a polymer to a suitably polarised surface. Surface modification by electrografting is particularly suited to modification of conducting or semi-conducting surfaces as it provides a robust organic/metal interface. Within the meaning of the present invention 'conductivity enhancing additives' are ionic conductivity enhancers that are, for example, ionically active compounds. Ionically active compounds include ionisable compounds, that is, ionic dopants, such as inorganic salts, usually metal salts such as MX, where M is alkali metal, alkali earth metal, Al or any other metal which allows for battery operation; and where X is a negatively charged ion (anion) such as $BF_4$, $PF_6$, FSI, TfO, TFSI, or any other anion which is stable under the conditions of battery operation chosen and renders the electrolyte sufficiently ion conductive for the application; certain organic cations such as those highlighted in FIG. 6 or any other cation which allows for battery operation; organic anion such as those highlighted in FIG. 5 or any other organic anion which allows for battery operation, for example, such as OTf, TFSI, $B(CN)_4$, and/or ionic liquid or other compounds or species that dissociate into mobile ions within the composite polymer matrix of the invention.

Suitably, the one or more ionic liquids comprising an organic cation selected from FIG. 6 or any other cation which allows for battery operation; and organic anion selected from OTf, TFSI, FSI, or $B(CN)_4$. It will be understood that such ionisable species increase the mobility of transportable ions in the polymer matrix. As further mobile ions are provided, the ionic conductivity of the polymer is increased. It will be appreciated that conductivity enhancing additives include 'ionic dopants' which are typically one or more ionisable salts, such as inorganic salts, including metal salts, organic salts. Preferred 'ionic dopants' for energy storage device include compatible metal salts suitable for storing ions which take part in device's chemistry, such as lithium salts, particularly LiTFSI, in the case of a lithium ion battery. Examples of preferred ionic dopants are provided below. In one embodiment, the one or more ionic dopants are selected from the group consisting of: ionic liquids as described above, and one or more salts, particularly electroactive salts, such as metal salts, preferably, a lithium salt, for example LiTFSI. Suitably, the salts are stable within the electrochemical window of the electrochemical application. Exemplary ionic dopants are composed of a metal ion allowing reversible cycling in a battery such as Li, Na, K, Be, Mg, Ca, B, Al, Zn charge balanced with an anion which allows sufficiently fast ion transport and is stable within the electrochemical application, for example TFSI, FSI, $PF_6$, $BF_4$, $CF_3SO_3$, $(Alkyl)BF_3$, $(Alkyl)_nB(CN)_{4-n}$, where n is from 0 to 4.

In another aspect, the invention provides a process for surface binding a conformal film or coating of a solid polymer electrolyte onto one or more surfaces of a polarisable substrate by forming a polymer composite thereon in a single step involving polymerisation of one or more polymer electrolyte precursors including one or more monomers in the presence of conductivity enhancing additives comprising one or more ionic liquids and optionally one or more ionic dopants on the surface.

Preferably, the surface binding step, whereby the polymer adheres on the one or more surfaces of the substrate, results from polymerisation initiation on a polarised surface to which potential is applied via an electrografting process or other process capable of surface binding the polymer onto the surface. Parameters facilitating surface bound deposition of the polymer include the nature and concentration of the solvent components used in the process and the nature of substituents or functional groups in the monomer/IL structure. Indeed, in some embodiments, the substituents themselves may be radical initiators. The nature of the substrate and the state of their surfaces (i.e. passivation layer) also plays a role.

In a further aspect of the invention, there is provided a surface bound conducting polymer or a solid polymer electrolyte film or coating having incorporated therein conductivity performance enhancing additives comprising one or more ionic liquids and one or more ionic dopants, wherein the ratio of ionic liquids to monomer in the polymer is as described above.

In another aspect still, the invention provides a process for forming a solid polymer electrolyte onto one or more surfaces of a substrate comprising the steps of:

activating the surface of the substrate to facilitate formation of the polymer thereon, surface binding the polymer onto the surface by polymerising in a single step one or more solid polymer electrolyte precursors onto the modified substrate surface, the one or more polymer electrolyte precursors consisting essentially of one or more polymerisable monomers in one or more ionic liquid solvents and one or more ionic dopants.

In another aspect there is provided a process for forming a solid polymer electrolyte onto one or more surfaces of a substrate comprising the steps of:

activating the surface of the substrate to facilitate formation of the polymer thereon, surface binding the polymer onto the surface by polymerising in a single step one or more solid polymer electrolyte precursors onto the activated substrate surface, the one or more polymer electrolyte precursors consisting essentially of one or more polymerisable monomers, one or more ionic liquids having a melting point below 100° C., and one or more ionic dopants, wherein the one or more conducting polymer precursors are present in amounts that provide a substantially pinhole free polymer film having substantially all of the conductivity enhancing additives entrained therein.

In another aspect there is provided a process for forming a solid polymer electrolyte onto one or more surfaces of a substrate comprising the steps of:

activating the surface of the substrate to facilitate formation of the polymer thereon, surface binding the polymer onto the surface by polymerising in a single step one or more solid polymer electrolyte precursors onto the activated substrate surface, the one or more polymer electrolyte precursors comprising one or more polymerisable monomers, one or more ionic liquids having a melting point below 100° C., and one or more ionic dopants, wherein the one or more conducting polymer precursors are free of non-ionic liquid solvent and are present in amounts that provide a substantially pinhole free polymer film having substantially all of the conductivity enhancing additives entrained therein.

In another aspect there is provided a process for forming a solid polymer electrolyte onto one or more surfaces of a substrate comprising the steps of:

activating the surface of the substrate to facilitate formation of the polymer thereon, surface binding the polymer onto the surface by polymerising in a single step one or more solid polymer electrolyte precursors onto the activated substrate surface, the one or more polymer electrolyte precursors comprising one or more polymerisable monomers, one or more ionic liquids having a melting point below 100° C., and one or more ionic dopants, wherein the one or more conducting polymer precursors are present in amounts that provide a substantially pinhole free polymer film having substantially all of the conductivity enhancing additives entrained therein, and wherein on formation on the surface the polymer film is free of polar or non polar non-ionic solvent.

Suitably, the conductivity enhancing additives consist of one or more ionic liquids having a melting point below 100° C. Alternatively, the conductivity enhancing additives consist of one or more ionic liquids having a melting point below 100° C. and one or more metal salts.

It will be understood that in some embodiments, the ionic liquid may be present in an amount up to a concentration where a homogenous product can be obtained after polymerisation that avoids a miscibility gap occurring. Notably, the concentration varies significantly with the nature of the polymer and/or the ionic liquid. For example, for a diacrylate monomer, an ionic liquid concentration of up to 40 wt % (based on monomer) can be used, whereas for a monoacrylate, ionic liquid concentration of greater than 20 wt % (based on monomer), a miscibility gap tends to occur. In another embodiment, for monoacrylate, the proportion of ionic liquid:monomer may be up to 40 wt % (based on monomer).

In a further aspect, there is provided a conducting surface preferably an ionically conducting surface conformally coated onto a substrate, preferably an electrical conducting surface, comprising a conducting polymer having incorporated therein, one or more ionic liquids and the one or more ionic dopants as conductivity enhancing additives.

An 'ionic liquid' is a compound, more particularly, a low temperature molten salt composed entirely of ions, having a melting point preferably below 100° C. Exemplary ionic liquids are described elsewhere herein.

The use of an ionic liquid as a simultaneous conductivity enhancer and plasticiser for the polymer also has the additional benefit of being a supporting electrolyte necessary for the electropolymerisation and binding process. Using the ionic liquid as supporting electrolyte in the surface binding process ensures that the ionic liquid is present in significantly high enough concentrations at the surface during polymerisation, and without requiring use of any additional conventional non-ionic solvent in the process, ensures that the ionic liquid and ionic dopant when present becomes entrained in or associated with the polymer matrix in significant amounts that are useful for providing the good ion conductivities of the invention.

Where the surface binding process is an electrografting process, the dual functional use of an ionic liquid as supporting electrolyte and conductivity enhancing additive for the resulting electrografted polymer results in polymer composite materials having very high ionic conductivities as discussed above. Such ionic conductivities from single step fabrication are not possible for prior art polymers which lack the degree of incorporation of such conductivity enhancing ionic liquids additives.

As mentioned above, ionic liquids are salts with low melting points that can be liquid at room temperature. The fact that they are comprised entirely of charged ions makes them an ideal candidate as additives to enhance the ionic conductivity of conducting polymers and also to act as a solvent/supporting electrolyte medium for electrosynthetic methods.

The following points outline the additional improvements that the process of the invention holds over existing conducting polymer fabrication strategies that do not use surface binding polymerisation techniques. Firstly, the present process is simpler, requiring only a single step to fabricate and entrain significant amounts of conductivity enhancing additives in a conformally applied polymer coating or film. Existing techniques for SPE creation use excess conventional organic solvents and/or supporting electrolytes which have to be removed post fabrication, and discarded or recycled resulting in additional processing steps. The relatively large amounts of ionic liquid incorporated in the ion conducting polymer lead to enhanced ionic conductivity compared to conducting polymers fabricated using non-IL solvent. The high amounts of conductivity enhancing additive, particularly, ionic liquid, incorporated into the polymer composite material facilitate faster ion migration through the polymer matrix, while simultaneously improving the mechanical properties of the polymer to better enable it to withstand mechanical stresses induced during battery manufacture and/or operation. Furthermore, fabrication of energy storage devices comprising the SPE of the invention is safer since flammable and volatile organic solvents used are replaced with ionic liquids. Furthermore, the conducting polymer and precursor mixture including solutions in ionic liquids are more stable during fabrication due to the wider electrochemical windows associated with ionic liquids than conventional precursor solutions utilising non-ionic liquid solvents. Furthermore, the dual use of ionic liquids as conductivity enhancing additive and solvent and a supporting electrolyte medium enables the grafting of monomers possessing relatively negative reduction potentials at which conventional electrolyte media would decompose, thereby diversifying the basic monomers that can be successfully utilised in the process of the invention.

A further advantage of such dual use of the present process is that unlike conventional processes, the supporting electrolyte/solvent does not need to removed (together with the reaction medium) after polymerisation. In the present process, the ionic liquid is used in amounts that ensure full incorporation into the polymer and thus avoid such clean up steps. These improvements are particularly significant for the purposes of 3D microbattery fabrication as, in addition to improving battery performance compared to other SPE coating approaches, they will add reliability and cost reduction to the SPE manufacturing process.

After initiation the conducting polymer film or coating may be allowed to grow to a predetermined thickness on the surface of the substrate independently of the potential applied to bind the polymer to the surface in the radial initiating step. Suitably, the film or coating has, or is allowed to grow to, a thickness of from a few nanometres (for example, 1-10 nm) to about 10 microns, whereby the thickness is preferably controlled by adjusting one or more of: the potential application time, the residence time of the same in contact with the bulk of the monomer solution and the degree of applied potential. For example, where electropolymerisation occurs between −1.5 and −2.5 V (vs ref. electrode), the potential in this 1V potential window may be adjusted to control film thickness.

The maximum thickness of the film or coat is determined by the time allowed for polymer propagation before propagation quenching and/or before the substrate is separated from the monomer and conductive enhancing additives. It will be understood that where the film or coating grows to thicknesses outside this range, the film or coating may lose definition due to loss of controlled polymer growth or resultant irregular polymer growth thereby negating the advantages offered by the conformally applied polymer. Furthermore, the film or coating thickness is desirably controlled to ensure that the thickness remains in the desired range by adjusting process parameters including the initial electrochemical potential applied. For example, a minimum potential to generate a radical must be applied, yet a potential necessary to avoid irregular (bulk) polymerisation must be avoided. Likewise, the time for which the electrochemical potential is applied also influence the thickness. However, to a certain extent the thickness is a function of time; at some point (depending on the polymer) the created layers prevent further surface growth and any further polymerisation occurs in the bulk monomer solution. Time intervals between potential application, as well as the period of time for which the activated surface remains in contact with the monomer bulk after switching off the electrochemical potential, control of process temperature, etc. are further influencing factors. Most preferably, the polymer growth is self limiting polymer growth, preferably, providing a film or coating thickness of from about several nm (for example 1 to 10 nm) to about 1000 nm. Within this range, the film or coating formed is conformally applied and substantially defect free. In this regard, electrografting polymerisation processes are desirable since after initiation, polymer growth is self limiting.

Smart Polymers

In one embodiment, the monomer, ionic liquid and/or other species present may comprise one or more functional groups, which may be protected or otherwise, that are stimuli responsive groups that do not participate in polymer formation, but provide 'smart' or 'sensing' functionality to the polymer/composite material formed. For example, hydrophilic, hydrophobic, or other reactive groups, pH responsive groups, emissive, absorptive, fluorescent groups, are preferred. It will be appreciated that where the one or more monomers and/or the one or more ionic liquids and/or the one or more optional ionic dopants comprise surface modifying functional groups, the physical and/or chemical properties of the polymer formed and thus the solid polymer electrolyte can be tailored as desired thereby providing 'smart' materials.

Crosslinking

In a related embodiment, the one or more functional groups may be capable of undergoing crosslinking reactions between the polymer chains/strands. Depending on the nature of the functional groups present, crosslinking may occur automatically or may be initiated on application of crosslinking conditions. Suitable crosslinking groups include —COOH and/or —NH$_2$, for example. It will be appreciated that the degree of crosslinking allows the mechanical and/or structural properties of the polymer film or coating to be tailored as desired. For example, the degree of crosslinking may affect the rigidity and/or structural strength of the polymer formed. While crosslinking can positively affect the mechanical strength and rigidity of the material, it is preferred that degree of crosslinking is not sufficient to detrimentally affect ion transport throughout the polymeric matrix.

By 'incorporated therein', it is meant that on deposition by surface binding, the monomers and/or the conductivity enhancing additives are (i) incorporated into the polymer chains, or (ii) become positioned intimately in contact with or associated with the polymer chains. For example, the additives may be embedded between or within polymer strands or brushes, or within intrapolymer spaces formed by polymer strand crosslinking, when present.

In a preferred embodiment, all or a portion of the one or more ionic liquids have suitable functional groups such that they themselves function as polymerisable monomers. Suitable functional groups comprise at least one polymerisable group. Suitable functional groups include, for example, acrylate, vinyl, styrene, acrylonitrile, olefin and/or other polymerisable groups which may be optionally substituted with groups such as alkyl groups, or ionisable functional groups such as —COOH or —NH$_2$. It should be noted that one or more polymerisable groups can reside either on the cation or anion component of the ionic liquid or both cation and anion components. In some embodiments, one or more polymerisable groups may be provided on the one or more dopants of the invention when present. Such ionic liquids and/or dopants can become directly involved in the polymerisation step, to form co-polymers with the one or more of the other polymerisable monomers of the precursor mixture. Insofar as the conductivity enhancing additives themselves comprise polymerisable groups, the can copolymerise with the monomers present to form copolymer chains. For example, ionic liquid cations or anions comprising acrylate groups may become incorporated into the polymer chains. The molar ratios of the monomer components allow the composition of the copolymers to be tailored as desired.

Copolymers formed from polymerisable IL/dopant/monomer mixtures are expected to exhibit better ion transport, improved integrity of the composite polymer via homogeneity by avoidance of miscibility gaps, as well as certainty of incorporation of the ionic component into the final composite due to co-polymerisation. Furthermore, in either case, the conductivity enhancing additives cannot easily leach or be removed/lost from the polymer structure, even where harsh processing steps are applied to the polymer material, for example, multiple solvent washes, heating, evaporation or treatment under vacuum and/or under operating conditions such as temperature extremes, heat or humidity.

Where electrosynthetic methods are used to initiate the surface bound polymerisation of the invention, desirably, the one or more monomers or polymerisable ionic liquids, if present, are reduced at a suitably polarised surface to form a radical ion initiator. It will be appreciated that certain monomers are reducible at particular applied potentials. The monomers must be electrochemically active, meaning at the applied potential a radical can be generated from the monomer structure. While this process can occur in the absence of conductivity enhancing additives, the final polymer film generated would have insufficient ion conductivity (for example, as low as $1 \times 10^{-7}$ s/cm, and therefore would not allow for fast enough ion transport for Li battery applications. All films, irrespective of whether they contain additive or not, should be electrically insulating because otherwise they cannot fulfil their second role of being a separator membrane between the two electrodes. The polymer film requires these characteristics in order to allow ions through but not electrons.

As explained above, as the solid polymer is formed onto the one or more surfaces of the substrate, the one or more monomers, and the conductivity enhancing additives, that is, the one or more ionic liquids, and the optional one or more ionic dopants, become associated with, incorporated into, the polymer structure or become lodged or embedded within the polymer structure as described above.

In particular, depending on the physical and/or chemical properties of the monomers and/or performance enhancing additives (which may depend on the functional groups present in these components), these components act as conductivity enhancers by supporting ion transport in the polymer or facilitate ionic movement along polymer chains, and thus movement of ionic charge throughout the solid conducting polymer structure.

Suitably, inclusion of the ion conductivity enhancing additives into the polymer matrix as described above enhances the composite polymeric material's ion conductivity to the degree that the solid polymer obtainable by the process of the invention does not require a separate conductivity enhancement treatment and/or processing step, for example, incorporation of further performance enhancing additives into the polymer structure/scaffold post fabrication. The conductivity of the polymer composite material formed by the single step process of the invention is significantly improved over prior art methods which require several process steps for polymer formation and incorporation of conductivity enhancing additives.

In a preferred embodiment, the conductivity enhancing additives consist essentially of the one or more ionic liquids and the optional one or more ionic dopants. In other embodiments, the conductivity performance enhancing additives consist essentially of the one or more ionic liquids and the optional one or more ionic dopants, as well as monomers modified to have functional groups that contribute to or assist with ionic transport within the polymer.

Suitably, the conducting polymer and/or the solid polymer electrolyte film or coating is ionically conductive but chemically unreactive, at least under the conditions to be applied for a particularly desired application.

Surface Binding Mechanism

In the present methods, suitably the monomer is reduced onto the activated substrate surface to form a radical ion species capable of initiating polymerisation. This avoids the need to introduce any other components into the electrografting solution that do not contribute to the composite polymer structure or those that have to be subsequently removed from the resulting SPE, such as, a separate radical initiator component, organic or aqueous solvents, stabilisers, etc. It will be understood that the process described herein is substantially free, and more preferably, completely free of conventional solvents, such as polar or non-polar non-ionic solvents.

Desirably, the polymerisation step involves radical ion generation at the activated surface and polymer chain propagation using the one or more monomers and/or compatible ionic liquids that comprise one or more polymerisable functional groups as feedstock for the polymerisation process.

For example, the polymerisation step may be initiated through electrochemical generation of a radical ion on the substrate surface from a suitable species present that supports radical formation, for example, a monomer molecule or ionic liquid component comprising at least one suitable polymerisable group which may be provided on the anion, cation or both anion and cation components of the ionic liquid. It will be appreciated that when further monomer or other species comprising suitable polymerisable groups contact the initial radical ion formed on the one or more surfaces, the initial radical ion reacts with the further monomer to link the initial radial to the monomer or species to form a longer chain radical which then can react with further monomer or polymerisable species to form an even longer chain radical, and so on sequentially, while bulk monomer or other polymerisable species remain in contact with surface thereby forming a successive longer polymer chains while monomer remains or until the propagation phase is terminated or quenched. The radical ions formed and chemisorbed on the surface are radical anions or cations depending on the nature of the components used.

When a surface binding surface activation method is used, for example, electrografting, the initially formed ion radical is chemisorbed or otherwise strongly bonded onto the activated surface. Subsequent polymer propagation occurs away from the attachment point to iteratively form a successively longer polymer chain depending on how many rounds of propagation occur. In this manner, the polymer is bound onto, or adheres to, the substrate surface through a grafting or anchoring process during the initial stage of polymer matrix formation.

Preferably, the forming step involves binding the polymer onto the surface of the substrate by a surface binding deposition step, for example, by grafting the polymer onto the surface of the substrate, preferably by electrografting, preferably involving radical initiated electrografting, or by another surface bound deposition step, such as electrodeposition involving chemisorption through adhesion promoters and functional groups. Where the surface binding process, is for example, an electropolymerisation process, it will be understood that the electropolymerisation involves free radical formation from the one or more monomers and/or other reducible species capable of forming a radical under the potential applied. The potentials required are dependent on (i) the nature of the monomer and (b) the nature of the substrate. For example, one exemplary range is between −1.5 and −3.5V (vs Pt quasi reference electrode).

As explained above, where electropolymerisation methods are employed in the polymerisation step, the ionic liquid functions as one or more of: a plasticiser, a source of ionically conducting ions for the conducting polymer, as well as supporting electrolyte for the electropolymerisation method.

Suitably, after polymerisation is completed, for example, by quenching/termination of propagation, if required, the polymer can be rinsed with methanol or other suitable solvent to remove unreacted monomer blend from the composite polymer formed. As explained above, on polymerisation of the one or more monomers through an initiation step involving forming an initial radical ion by reduction of a monomer molecule on the surface, the one or more ionic liquids, and the optional one or more ionic dopants, become incorporated, lodged or embedded into the growing polymer structure as conductivity enhancing additives. Importantly, other than washing away unreacted monomer components, the rising step does not remove the ionic liquid and/or optional ionic dopants, preferably a metal salt, entrained in the polymer matrix, which are preferably, fully incorporated into the polymer matrix.

In embodiments, where initiation commences through radical formation via application of an electrical potential, the process of the invention advantageous does not require use of traditional polymerisation initiator compounds, such as peroxides, azonitriles, and other radical initiators. Accordingly, desirable polymer precursors consist essentially of the one or more polymerisable monomers, the one or more ionic liquids and the optional one or more ionic dopants. No additional additives whatsoever are required to support polymerisation and/or incorporation of the ionic liquids and ionic dopants into the polymer structure/scaffold. Thus, no post-fabrication conductivity enhancement steps are required. As the unreacted monomer is readily removed by rinsing, the ionic liquid is entrained in the polymer, and no conventional non-ionic solvents are used in the current polymer fabrication process, there is no need for volatile solvent removal or heating/evaporation processing steps. Therefore, the process avoids leaching of the ionic liquids and/or ionic dopants from the 3-D polymer structure/scaffold. The process thus addresses the prior art problem associated with solid polymer electrolytes which tend to lose the incorporation ionic dopants/additives during solvent removal.

Surface Binding—Electropolymerisation

As explained above, preferably, the surface binding step results from electrosynthetic techniques suitable for adhering the polymer to the one or more surfaces of the substrate in the form of a surface bound conformal coating or film having a thickness in the range as described above. For example, the electrosynthetic technique may be an electropolymerisation or electrografting process or other process suitable for surface binding the polymer to the substrate surface in the form of a conformal coat of substantially uniform thickness. Desirably, after fabrication the polymer is bound to the substrate surface to a sufficient degree to resist peeling or washing under conditions such as rinsing, ultrasonication, heating, pressure, etc., and most importantly, under conditions associated with repeated battery cycling.

In this regard, it is preferred that a substrate, being a conducting or semi-conducting surface is modified to chemisorb thereon a radical anion initiator formed from one electron reduction of a suitable monomer component (electroinitiation of polymerisation). This radical then commences chain propagation on contacting surrounding monomer and/or other polymerisable species provided to the surface. Typically, the surface is activated in this manner by applying sufficient electrical potential to allow the initial reduction of the monomer or other suitably reducible species present to a radical ion initiator which propagates polymerisation when sufficient supply of monomer or other polymerisable species is available. For example, transfer of one electron from the polarised surface to a monomer molecule produces the radial ion initiator which is chemisorbed onto the surface on generation.

Electropolymerisation involves electrogeneration of a radial initiator molecule whereby the polymerisation occurs is usually a bulk polymerisation process that occurs in solution. Usually some polymer is deposited on the electrode though the bulk of the polymerisation process takes place in solution. The most common experimental techniques used for electropolymerisation include cyclic voltammetry (potentiodynamic), galvanostatic and potentiostatic techniques.

During the electrografting process, the one or more surfaces of the substrate are first polarised by applying a suitable electrical potential thereto to form an activated surface. The surface is therefore modified or activated by a positive or negative charge, depending on the nature of the monomer used in the process. On contacting a suitable redox active species to the activated surface, for example, a monomer molecule or other redox active species, the monomer and/or other species is either reduced or oxidised by picking up or losing an electron from/to the activated surface to form a radical ion species which is chemisorbed into the polarised surface under the effect of the applied potential. Chemisorption involves a chemical reaction between the surface and the radical adsorbate and/or the IL/dopant when polymerisable functional groups are present thereon, where typically, new chemical bonds may be generated at the adsorbent surface. The surface bound radical then functions as polymerisation initiator radical.

Independently of the potential applied, the radical initiator then reacts with suitable monomer molecules in the vicinity of the surface. Thus, on application of a suitable potential, a film of radical ion adsorbate is formed on the activated surface of the substrate whereby the chemisorbed radical ion provides the graft point for each polymer strand formed. As the polymer strands are surface bound, electrografting polymer onto the activated surface addresses organic coating/ metal interface weaknesses and poor adherence, improves contact, and allows precise control of the chemical composition of the resultant polymer film or coating which grows away the surface irrespective of the potential applied so long as sufficient monomer or other polymerisable species is available. For at least this reason, electrografting is a preferred electrosynthetic method for generating the conducting polymer films of the invention in which strong adhesion between the organic polymer and the surface of the substrate is promoted. Furthermore, electrografting is suitable to chemisorb radical initiator onto a variety of conducting surfaces.

Surface Activation

Preferably, the surface is activated by cathodic polarisation in a suitable electrochemical process. More preferably, the surface is activated by supplying a suitable potential as part of an electrografting process. It will be understood that in embodiments where electrografting is utilised, the surface of the substrate is of a conducting or semi-conducting material. Electrografting is preferred because it results in strong adhesion of a thin insulating polymer film on onto the surface when polarised at an appropriate potential. In an electrochemical cell, the substrate is configured as the cathode.

Preferably, the electrosynthetic process, particularly the electrografting process is carried out under oxygen and water free conditions. Typically the potential need only be applied for a few second, for example, in the range of from 1 to 60 seconds, to produce a strongly adhered thin conformal film of polymer on the surface. It will be appreciated that the time required for electroinitiation is influenced by holding time, monomer concentration and the diluent used.

Differences from Prior Art Processes

As is clear from the above discussion, the process of the invention is less complex than prior art methods, yet provides superior performing conducting composite polymer materials. Firstly, the polymer precursors do not need to include electrochemically inactive salts as supporting electrolyte for the electrosynthesis. For example, in prior art electrografting processes, tetraethylammonium perchlorate (TEAP) is typically used as supporting electrolyte.

Likewise, other than supporting electrolyte salts when required, the polymer precursors do not require a polymerisation initiator component, such as, H radical, diazonium salts, superoxide radical, etc. As these components are not required, clean up steps to remove same post fabrication are not necessary.

Thus polymer precursors require no additional reaction media components, for example, conventional polar or non-polar solvents (the non-ionic liquid solvents) which are typically used in existing prior art processes, which include for example, aqueous solvents or organic solvents, such as acetonitrile (ACN), dimethylformamide (DMF), ethanol, etc., Furthermore, as the polymer of the invention is substantially or completely free of such conventional solvents, the process does not require treatment, other than rinsing with a solvent, to remove unreacted components, typically unreacted monomer components. For example, the evaporation/heat treatment step used in some prior art processes is not required. Thus, there is no unwanted loss of the polymer matrix entrained ionic liquids and/or ionic dopants post fabrication.

Precursor Mixture

In one aspect, there is provided a precursor mixture for forming a conformal film of ion conducting polymer onto one or more surfaces of a substrate in a single electrosynthetic step, the mixture consisting essentially of one or more monomers, one or more ionic liquids having a melting point of less than 100° C., and optionally one or more metal salts, wherein the relative amounts of the one or more conducting polymer precursors is such that on polymerisation substantially all of the ionic liquid and ionic dopant, if present, are incorporated/entrained in the polymer without formation of a miscibility gap, and wherein the one or more conducting polymer precursors are free of non-ionic liquid solvent.

In a further aspect still, there is provided a conducting polymer precursor mixture for forming a conformal film of ion conducting polymer onto one or more surfaces of a substrate in a single electropolymerisation step, the mixture consisting essentially of one or more monomers, one or more ionic liquids having a melting point of less than 100° C., and optionally one or more ionic dopants being a metal salt, wherein the concentration of the one or more conducting polymer precursors is such that on electropolymerisation substantially all of the ionic liquid is incorporated/entrained in the polymer without formation of a miscibility gap.

In a further aspect of the invention, there is provided a conducting polymer precursor mixture for forming a conducting polymer onto one or more surfaces of a substrate in a single step, the solution consisting essentially of one or more monomers, one or more ionic liquids, and optionally one or more ionic dopants, preferably being a metal salt. It will be understood that the ionic liquid:monomer concentration ratio is such to ensure a homogenous mixture of the one or more monomers, and/or the optional one or more ionic dopants, when present, yet is such that substantially all of the ionic liquid is incorporated/entrained in the polymer.

Suitably, the ionic liquids are incorporated into the polymer in any amount that does not result in a miscibility gap, and/or a non-homogeneous solution. In some embodiments, the concentrations of ionic liquids may be up to and including 40 wt % ionic liquid based on the amount of monomer present. However, this number may be higher depending on the nature of the polymer generated. As explained elsewhere herein, the ionic liquid:monomer ratio is therefore limited by the amount above which a miscibility gap occurs and the final composite polymer is no longer homogeneous nor a liquid or gel. However, it is believed that ionic liquid:monomer ratios where ionic liquid forms up to 80 wt % the final product will no longer be in the liquid or gel state. However, if enough Li salt dopant is added to such a mixture it may become solid or near gel like again.

Preferably, the solution consists essential of the one or more monomers, the one or more ionic liquids, and optionally, the one or more ionic salts, preferably metal salts. The high conductivities of the material of the invention can be achieved through these components alone.

Suitably, the solution of precursor mixtures does not include non-ionic liquid conventional solvents, such as acetonitrile (ACN), dimethylformamide (DMF), ethanol and other supporting electrolytes other than ILs encompassed in the present invention, such as those typically used in electrochemical processes; quaternary ammonium salts, quaternary phosphonium salts, etc. Desirably, alkylcarbonates, alcohols, polyethers, etc., and/or electrochemically inactive salts, such as tetraethylammonium perchlorate (TEAP) and/or polymerisation initiators, such as diazonium salts.

Electrochemical Cell

Where the fabrication process is an electrosynthetic process, it will be appreciated that formation of the conducting polymer on the one or more substrate surfaces is preferentially carried out using a three electrode arrangement comprising a working electrode, a counter electrode and a reference electrode, whereby the working electrode preferably forms the substrate surface for a solid polymer electrolyte deposition thereon. Preferably the working electrode substrate is already engineered into a 3D microstructure and therefore the polymer coated electrodes do not require any further device integration steps.

It follows that the substrate surface, i.e., a material which can be electrically charged (a battery electrode or any sufficiently electrically conductive surface which has to be coated) is electrically stable under the process operating conditions. The working electrode may be selected from the group consisting of: gold, platinum, glassy carbon and tin. These are common working electrode materials for electrochemical measurements but are not suited as a battery electrode material because they either are too heavy or do not allow the insertion of ions like Li or Mg into their lattice. Typical battery electrode materials are: graphite, Si, Sn, lithium titanate (LTO), Mg, Al or combinations (Alloys) thereof. The counter electrode is typically electrochemically inert and oxidation resistant material, for example, platinum or stainless steel. The reference electrode is either a standard electrochemical arrangement (Ag/Ag+; Kalomel; etc.) or a pseudo ref electrode, i.e. Pt, as long as it is reasonably stable during the period of applying the potential for initiating polymerisation. Either a standard electrochemical arrangement (Ag/Ag+; Kalomel; etc.) or a pseudo ref electrode, i.e., Pt, as long as it is reasonably stable during the period of applying the potential for initiating polymerisation. During processing, the one or more surfaces are contacted with a solution of the polymer precursors. Suitably, the process is carried out under an inert atmosphere, preferably free from moisture and air.

Applications

In a further related aspect, the invention provides an energy storage device comprising a conducting polymer or polymer electrolyte of the invention having incorporated therein one or more ionic liquids and optionally one or more ionic dopants as electrolyte performance enhancing additives. Most preferably, the polymer electrolyte is a solid polymer electrolyte. Suitably, the polymer of the invention is used as an electrolyte and/or separator of a battery and/or a photovoltaic device.

In a related embodiment, there is provided an energy storage device comprising a solid polymer electrolyte surface bound through electrografting as a conformal film of ion conducting polymer onto one or more surfaces of an electrically conductive substrate wherein the polymer has conductivity enhancing additives entrained therein, the conductivity enhancing additives comprising one or more ionic liquids having a melting point below 100° C. and one or more lithium metal salts, wherein the solid polymer electrolyte is substantially pinhole free having substantially all of the conductivity enhancing additives entrained therein. It will be understood that the energy storage device may be a battery, preferably, a microbattery, for example, a Li polymer battery.

Suitably, the battery may be a conventional battery. The composite materials of the invention may find particular use in lithium polymer batteries, such as LiPo, LiIP or Li-poly batteries. The materials can also be used as polymer electrolytes in photovoltaic applications. The materials can also be used in other coating applications where an electrochemical function is not required but where the process of polymerisation and coating (by electropolymerisation for example are beneficial). These applications may include membrane technology, corrosion or other protecting technologies. Additionally, the monomer blend may be augmented with other useful components such as a catalyst for heterogeneous catalysis, a dye for coloration purposes or even photovoltaic applications. In these latter (non-battery) applications, the presence of a Li-salt dopant is not required will actually be replaced by a catalyst or a dye, while the presence of an IL can be beneficial.

It will be further understood that the energy storage device includes a positive electrode; and a negative electrode. Preferably, the solid polymer electrolyte is conformally coated onto one or more surfaces of at one of the electrodes of the energy storage device. Suitably, the energy storage device further comprises a positive current collector and a negative current collector. It will be understood that in the energy storage device of the invention the solid polymer electrolyte functions as separator and as electrolyte. Preferably, the energy storage device is a liquid free energy storage device. Suitably, the energy storage device does not comprise a separator component. Suitably, the electrode configuration in the energy storage device of the invention is a planar electrode arrangement or a 3-D or stacked electrode arrangement or a side by side electrode arrangement.

Preferably, the solid polymer electrolyte used in the energy storage device of the invention is as defined in accordance with the invention, or is obtainable by the process according to the invention. In a preferred embodiment, the energy storage device of the invention is a battery, for example, a microbattery, preferably a high surface-area battery, for example 3-D battery, and more particularly a 3-D microbattery. Suitable, the energy storage device is rechargeable, such as rechargeable battery, preferably, a rechargeable 3D battery.

In a further aspect of the invention, there is provided for a use of an energy storage device according to the invention in a microsensing application, for example, a wireless smart sensor for swarm sensing for environmental monitoring; biomedical applications including use as an artificial membrane and as a modified surface on a medical device and/or implant, preferable to increase biocompatibility and as a battery in medical implants requiring a power source; environmental applications; photovoltaic applications; as a dielectric material in electrochemical capacitors; as modified surfaces for chemical and electrochemical sensors and biosensors; fuel cells and electrolysis membranes; as a modified surfaces in microelectronics and MEMS industry; as a surface modifier for conducting glasses; as a surface modifier without the ionic dopant in general where ionic conduction is not required. The materials may be useful in energy storage applications, for example, in energy storage devices for wireless microsensor nodes (e.g. swarm sensing), in energy storage for microrobotics or for implantable devices. The materials may be integrated with energy harvesting devices and microsupercapacitors, or in methods for method for applying an ionically conducting polymer to conductive surfaces. Suitably, the microsensors may be used for applications in biology, manufacturing, digital productivity, etc. in security. Another aspect of the invention concerns the concurrent use of one or more ionic liquids as a plasticiser, a supporting electrolyte, and as an ion conductivity enhancing dopant in a process for fabricating a conformally coated conducting polymer in a single step without need for use of non-ionic liquid solvents in the fabrication process.

Electrochemical Cell

In a further aspect, the invention provides an electrochemical cell for forming a solid conducting polymer onto one or more surfaces of a substrate, the cell comprising:

a working electrode forming the current collector surface for solid polymer electrolyte deposition thereon; a counter electrode; a reference electrode; and an electrolyte comprising a solid conducting polymer precursor solution comprising: one or more monomers, one or more ionic liquids, and optionally, one or more ionic dopants which provides a cation for battery operations, for example, Li, Na, Mg and Al.

BRIEF DESCRIPTION OF THE DRAWINGS

FIG. 1(b) is a close up of an anode surface coated in polymer.

DETAILED DESCRIPTION OF THE INVENTION

Figures 1A, 1B:
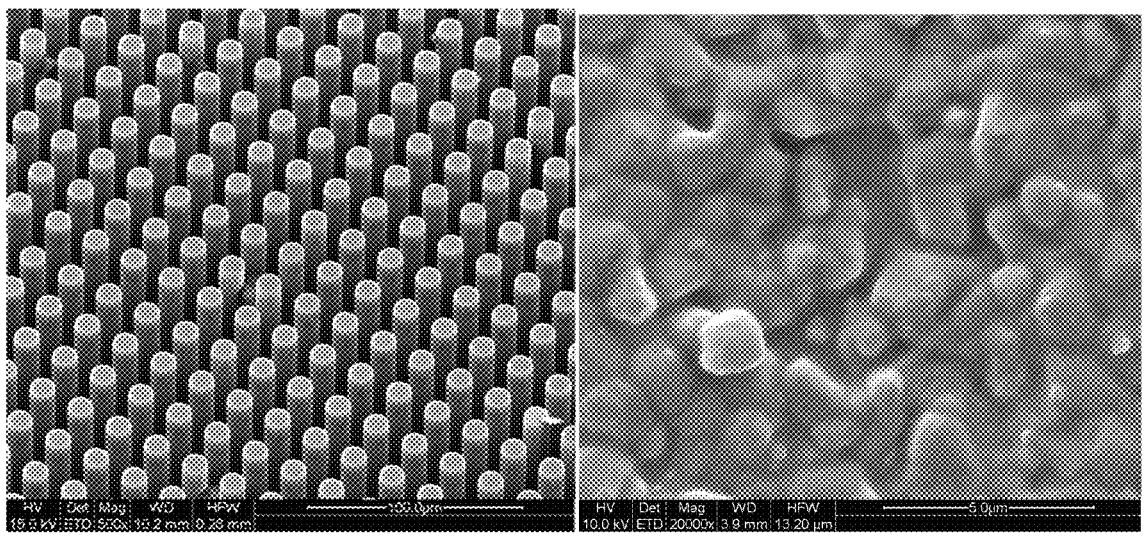
FIGS. 1(a) and 1(b) are SEMs of a conformally coated pillar 3-D substrate after coating with tin (PEO-DA electropolymerisation at −2.5V for 2 min onto Sn coated micro pillars) and composite polymer; the two sets of images show the difference in surface morphology after different reaction times for polymer coat formation suitable for a battery.
Figure 1C:
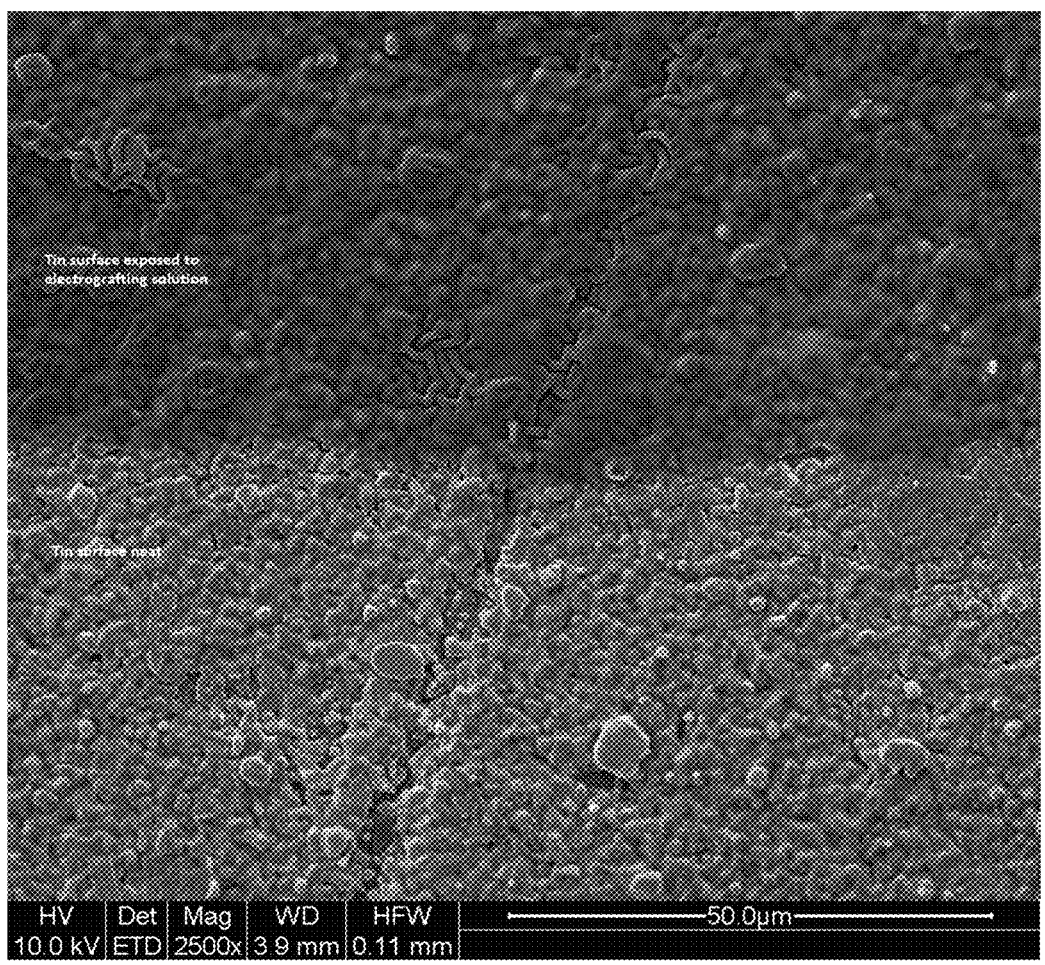
FIG. 1(c) is a comparison between a partially coated and uncoated surface.
Figure 1D:
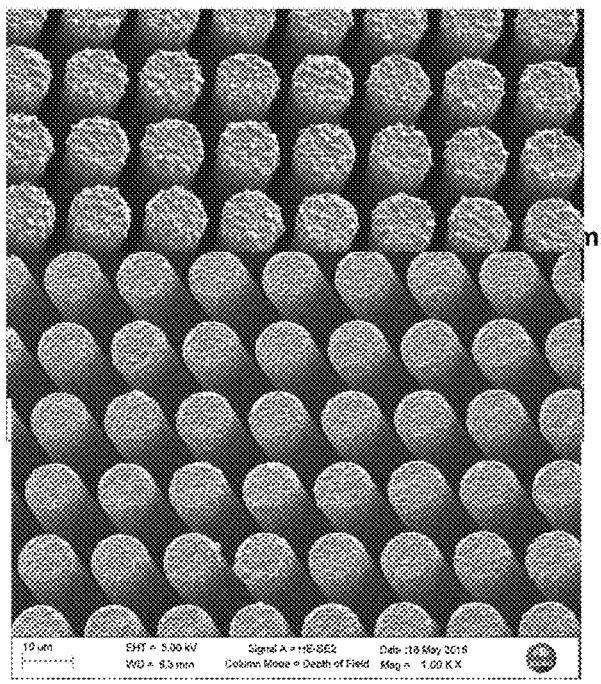
FIGS. 1(d) and 1(e) are further SEMs of a coated pillar 3-D substrate.
Figure 1E:
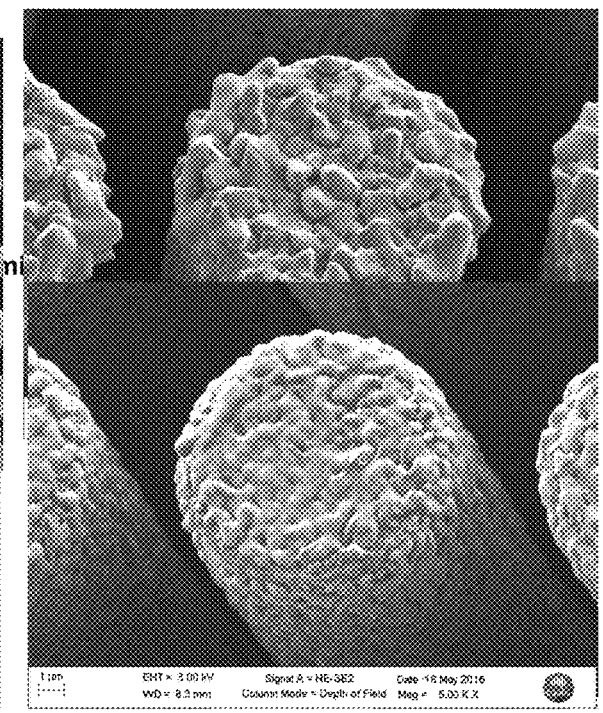

The invention described herein relates to the development of a single-step process to apply an electrically insulating polymer conducting polymer or battery electrolyte, incorporating all necessary conductivity enhancers and lithium-ion dopants, in a thin and conformal coating over a conductive substrate. A preferred intended application is the use of the polymer as a solid polymeric electrolyte (SPE) in 3DMBs. However, the process could also be used in other lithium-ion battery systems which utilise a polymer electrolyte in place of a liquid electrolyte.

The invention relates to the development of a new process to apply a solid polymer electrolyte, possessing all of the necessary criteria and performance enhancing additives mentioned above, in a single fabrication step. In one preferred embodiment, the fabrication process involves the electrografting of a monomer onto a battery anode surface from a solution comprised of only an ionic liquid, the monomer and a lithium salt.

The process of electrografting involves the use of a charged electrode to initiate the polymer grafting step (i.e. surface bound deposition), after which point the thickening of the polymer can be controlled by the electrode potential or can occur independently of the electrode potential. Typically, electrografting must occur from a solution that is comprised of a reducible monomer, a solvent and a supporting electrolyte. In prior art methods, acetonitrile (ACN), ethanol (EtOH) and dimethylformamide (DMF) are common solvents that are used due to the fact that they are inert under the electrochemical conditions (i.e. potentials) used to form the polymer, whilst electrochemically inactive salts such as tetraethylammonium perchlorate (TEAP) are used as the supporting electrolyte to provide sufficient conductivity for the electrografting process. In the process relating to the current invention, an ionic liquid is advantageously used as both ion conductivity enhancing additive and as supporting electrolyte in the electrografting process wherein the amount of ionic liquid used is an amount that can be fully incorporated into or entrained within the polymer. By fully incorporated or entrained, it is meant that at least 80-90%, and more preferably 90%-100% of the ionic liquid used becomes entrained within the polymer. Processing advantages include the avoidance of the need for an excess/unreacted IL and/or conventional solvent removal steps.

The ionic liquid, initially serving as ion conductivity enhancing additive and supporting electrolyte in the electrografting process, subsequently becomes fully incorporated or entrained into the resultant polymer to function as a plasticiser/conductivity enhancer for the SPE as defined above. It will be understood that, when present, the dopant, for example, lithium salt is also incorporated into the SPE as a result of being present in the electrografting solution. Amounts of the one or more dopant are also chosen to ensure that substantially all of the dopant is incorporated into the polymer during the single step fabrication process.

Some key advantages of the films/coatings of the invention are as follows:

The process is a simple and convenient one-step process.

The films/coatings of the invention are conformally fabricated, and are capable of completely covering a 3D surface with a high aspect ratio. An example of such a structure is a pillared array in which the pillars are 10 microns in diameter, 10 microns apart and 100 microns long—see FIG. 1, for example). The films/coatings of the invention are thin and substantially pinhole-free. In other words, the films are several tens of nanometers to one hundred nanometers thick and the diameter of any pores within a film are smaller than the thickness of the film.

The films/coatings of the invention contain multiple components (polymer, conductive additive and metal salts) that are evenly distributed throughout. By evenly distributed we mean that on the scale of tens of nanometers the electrical properties of the film are isotropic.

Finally, the surface bound nature of the film/coating of the invention means that the ionically-conducting polymer film is intimate contact with the electronically-conducting surface. "Intimate contact" means sufficiently close that the barrier to charge transfer from the electronic conductor to the ionic conductor is negligible. Charge transfer at such an interface involves electron tunnelling across the interface, so practically, this means the polymer film must be within a few atomic layers of the electronically conducting surface.

EXAMPLES

Resistance and conductivity results for a number of exemplary films of the invention are provided in Tables 1-6 below.

Conductivity Data for Exemplary Ternary Polymer Blends were Obtained by the Following Methodology In a first step, the respective monomer and ionic liquid were mixed in the required weight % proportions under dry conditions (i.e., in an inert gas filled glove box). To this mixture of known weight was added in a second step, the required amount (mol/kg) of an ionic dopant, i.e., a lithium salt in portions while stirring under dry conditions. In order to facilitate the dissolution process this mixture may be heated to 40-50° C. If required, stirring may be continued for one day at this temperature or room temperature. This mixture may be kept as a stock solution for multiple sample preparation at 4° C. and protected from light for several weeks. In the third step for polymer film formation an aliquot of this solution is brought into contact with 1 wt % of a radical initiator (i.e. AIBN, organic peroxides, etc.) under ultrasonication at room temperature for suspending the initiator in the mixture. The thus formed suspension is then applied to a mould (i.e. Petri dish, silicone mould, etc.) in a volume quantity estimated from the mould diameter to give a polymer film close to that of the target thickness of the film. In a fourth step, polymerisation of the mixture is then initiated by setting the filled mould in a laboratory oven at 30 to 80° C., depending on the nature of the radical initiator and the monomer, preferably near 40° C. if AIBN is used. After resting for 12-24 h at this temperature the cured polymer film is cooled to ambient temperature and kept under vacuum for 12-24 h.

Figure 2A:
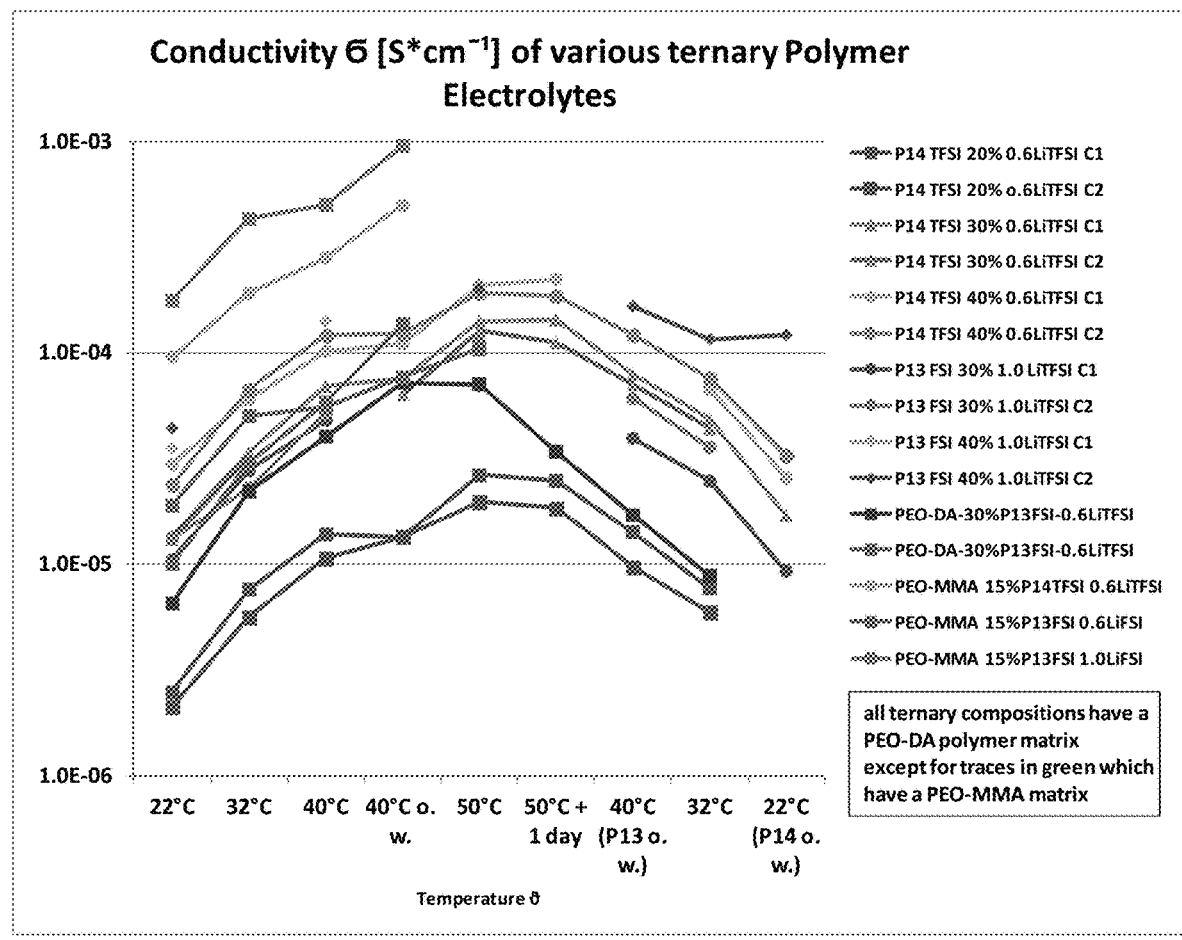
FIGS. 2(a) and 2(b) are graphs showing the resistance ionic conductivity of a number of SPEs of the invention against temperature.
Figure 2B:
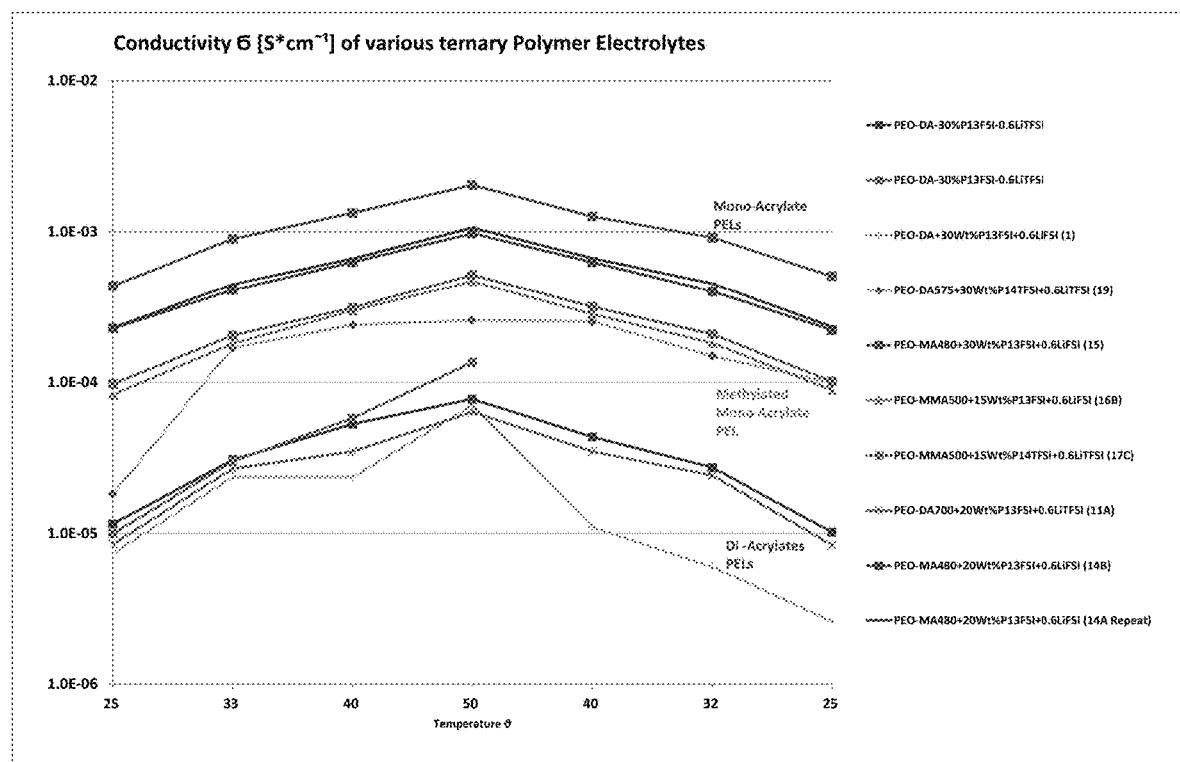
Figure 3:
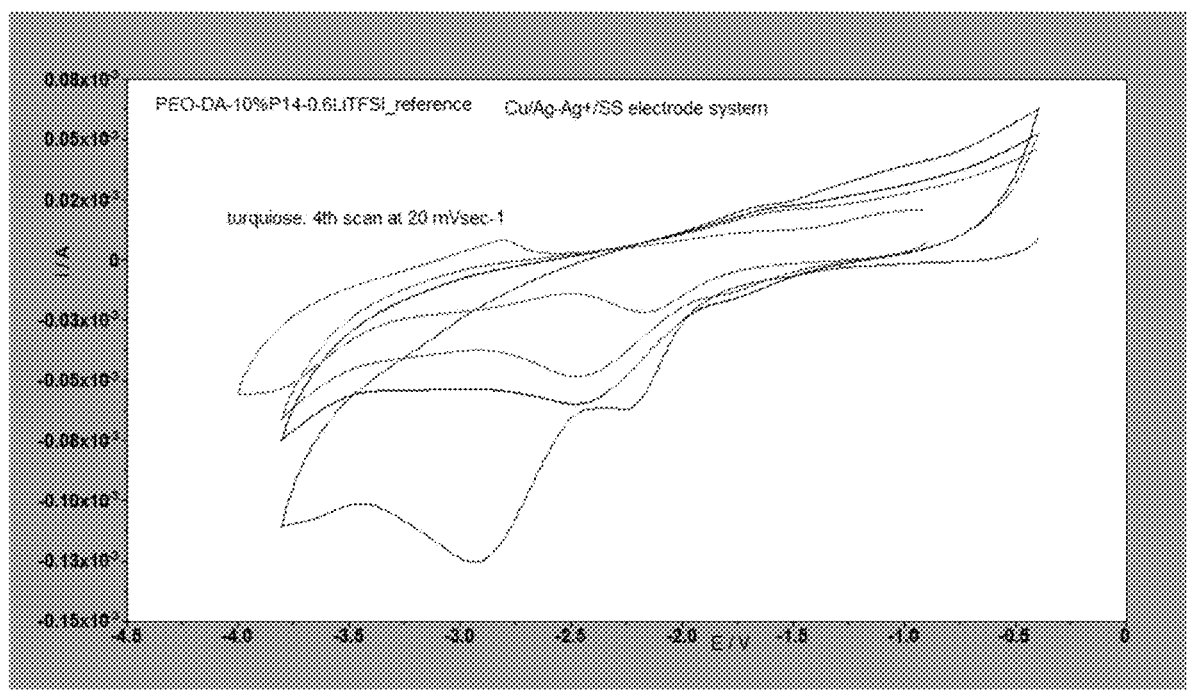
FIG. 3 is a cyclic voltammograms of a ternary PEO-DA/10 wt % P14-TFSI/0.6 molkg$^{-1}$ LiTFSI precursor mixture. Consecutive scans are depicted: $1^{st}$ scan (red), $2^{nd}$ scan (purple), $3^{rd}$ scan (green), $4^{th}$ scan (turquoise) all recorded at v=20 mVs$^{-1}$ on a copper substrate.
Figure 4:
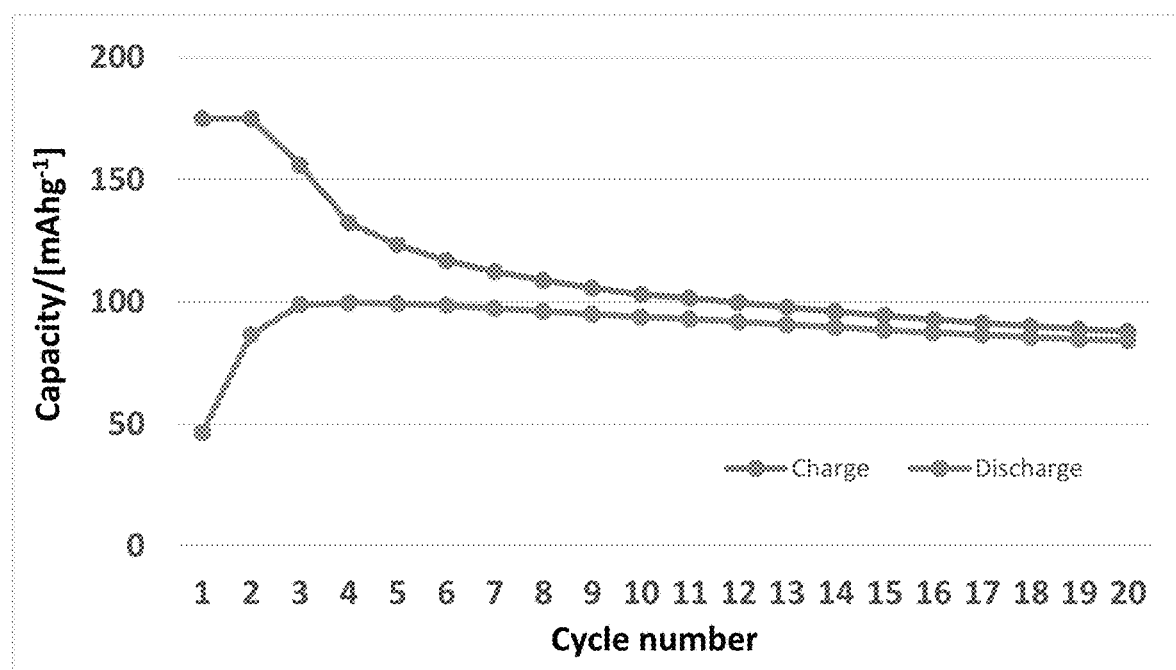
FIG. 4 is a representative charge/discharge profile recorded with a 2D test battery to demonstrate cyclability of the electrolyte:lithium metal (anode), lithium iron phosphate (cathode) assembled in standard coin cell.
Figure 5:
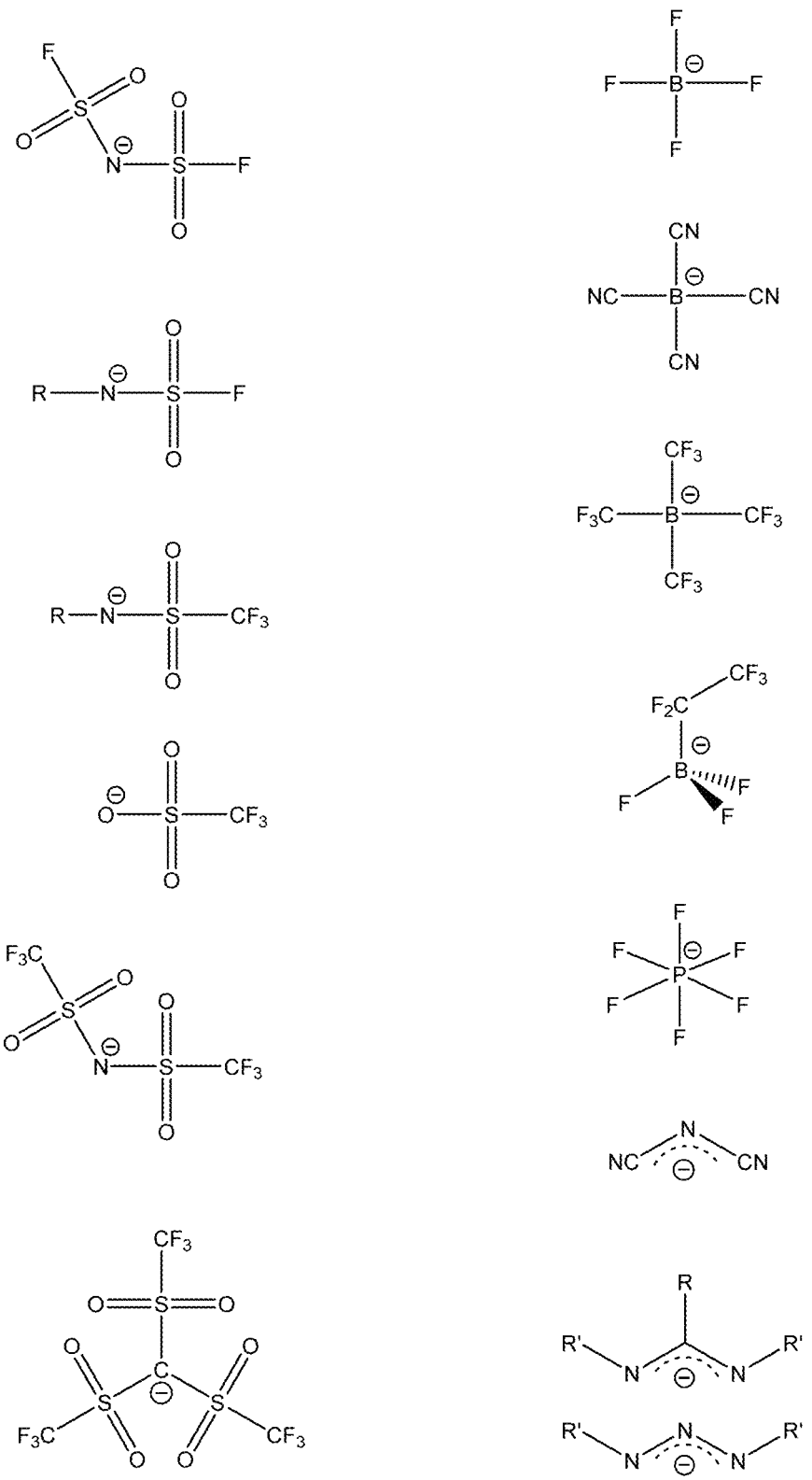
FIG. 5 is a schematic showing a number of exemplary ionic liquid anions of the invention, wherein each R, R', and $R_1$—$R_6$ is independently any organic/inorganic group which can be suitably used as part of an ionic liquid anion, but preferably are selected from $R_a$—N—($SO_2$F), wherein $R_a$ may be optionally substituted aryl, alkyl, alkyl-$SO_2$, aryl-$SO_2$, alkyl-C=O, aryl-C=O, (alkyl)$_2$P=O, (aryl)$_2$P=O, (alkyl)(aryl)P=O, (alkylO)$_2$P=O, (arylO)$_2$P=O, (alkylO)(arylO)P=O; in all cases the optionally substituted alkyl and aryl can optionally be fully or partially fluorinated, the alkyl and aryl groups can be linear or branched; the optionally substituted alkyl and aryl groups can contain ether functionalities; in R'—N—X—N—R' anions where X is C or N (in the bottom right of FIG. 5), R may be optionally substituted alkyl, aryl, alkyl and aryl may independent be fully or partially fluorinated, alkyl and aryl groups can be linear or branched; alkyl and aryl groups can contain ether functionalities.
Figure 6:
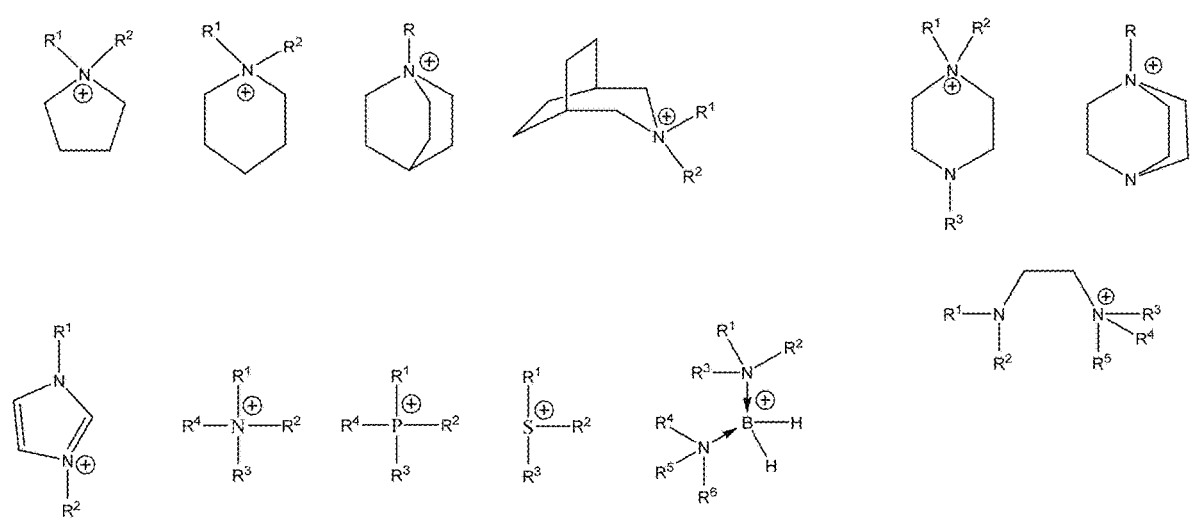
FIG. 6 is a schematic showing a number of exemplary ionic liquid cations of the invention, wherein R is any organic group which can be suitably used as part of an ionic liquid cation, wherein R may be independently selected from optionally substituted alkyl, aryl, alkyl and aryl, which can optionally be fully or partially fluorinated; optionally substituted alkyl and aryl groups which can be linear or branched; optionally substituted alkyl and aryl groups can contain ether functionalities.

From the finished polymer circular films of 12-15 mm diameter are cut by means of hole punch and their thickness is measured before being enclosed in standard coin cells used in battery assembly. The coin cell assembly is then placed in a temperature controlled oven and connected to the impedance unit of a potentiostat and data collection is performed by applying an AC current over a frequency range of 10 to 100.000 Hz. Data are first collected during a heating cycle followed by data collection during the cooling down cycle. A rest period of at least 24 h was allowed between each temperature point to allow for sufficient equilibration of the polymer sample. The ohmic resistance for a selected temperature is estimated from the touch-down point of the frequency response on the Z' axis (ohmic resistance) of the Nyquist plot generated from the measurement. The conductivity value ($\sigma$) for the selected temperature is obtained from the equation $\sigma=L/A \times 1/Z'$ where L is the thickness of the polymer film and A is the area of the film. Typically for each polymer material duplicate cells are constructed and measured. From the collected data, the graph shown in FIG. 2 displaying the temperature dependent conductivity for individual ternary polymer blends was generated.

Typical Procedure for the Preparation of Polymer Films on Conducting Surfaces, i.e. Battery Electrodes of the Invention Because of the moisture sensitivity of the ionic components, this procedure is conducted an inert gas filled glove box.

A suitable cell equipped with a counter electrode (Pt or stainless steel) and a Pt-wire quasi reference electrode was filled with the target monomer blend prepared according to the procedure of described above, but without addition of a radical initiator.

The electrode material (pre dried under vacuum) to be coated was then fitted to the cell and all electrodes were connected to a conventional potentiostat. In a first step, the integrity of the monomer blend and its electrochemical behaviour were confirmed by recording a cyclic voltammogram of the monomer blend at a scan rate of 20 to 100 mV/s. In the second step, the electrochemical method was then switched to applying a constant potential, i.e. —2.5V, as per cyclic voltammogram for a set period of time after which the electrode was removed from the solution and the exposed surface rinsed with a small quantity of methanol. The electrografting of a polymer film onto the surface was verified by recording SEM images of the exposed electrode and comparison with SEM images of the neat material. In addition surface conductivity measurements are performed.

Additional Information Relating to the Cyclability of the Polymeric Electrolyte in a Lithium Battery Under inert conditions, standard coin cells (CR2032 stainless steel cell, Hosen company, Japan) were assembled with lithium iron phosphate (LFP) cathode foil discs (10.5 mm diam.; 75 wt % LFP) and lithium metal foil discs (12 mm diam.) and a pre-fabricated ternary composite polymer membrane (14-15 mm diam.). The complete cells were rested for one day prior to commencing charge/discharge cycling at a c/50 rate on a battery test station (Maccor, USA) with the cells kept at constant temperature in an oven.

Ionic Conductivity (S/cm) of Various Ternary Polymer Electrolyte Films as a Function of Temperature

TABLE 1

| PEO-DA + x wt % P14 TFSI + 0.6 mol/kg LiTFSI | | | | | | |
|---|---|---|---|---|---|---|
| | 20% | | 30% | | 40% | |
| T/° C. | Cell 1 | Cell 2 | Cell 1 | Cell 2 | Cell 1 | Cell 2 |
| 22 | 2.5E−06 | 2.1E−06 | 1.4E−05 | 1.3E−05 | 3.0E−05 | 2.4E−05 |
| 32 | 7.6E−06 | 5.6E−06 | 3.4E−05 | 3.2E−05 | 6.0E−05 | 6.7E−05 |
| 40 | 1.4E−05 | 1.1E−05 | 6.9E−05 | n.a. | 1.0E−04 | 1.2E−04 |
| 40$^a$ | 1.3E−05 | 1.3E−05 | 7.5E−05 | 6.3E−05 | 1.1E−04 | 1.2E−04 |
| 50 | 2.6E−05 | 2.0E−05 | 1.4E−04 | 1.3E−04 | 2.1E−04 | 1.9E−04 |
| 50$^b$ | 2.5E−05 | 1.8E−05 | 1.4E−04 | 1.1E−04 | 2.2E−04 | 1.8E−04 |
| 40$^a$ | 1.4E−05 | 9.6E−06 | 7.9E−05 | 7.1E−05 | n.a. | 1.2E−04 |
| 32 | 7.6E−06 | 5.9E−06 | 4.8E−05 | 4.4E−05 | 6.7E−05 | 7.5E−05 |
| 22$^a$ | n.a. | n.a. | 1.7E−05 | n.a. | 2.5E−05 | 3.3E−05 |

$^a$after 48 h,
$^b$after 24 h

TABLE 2

| PEO-DA + x wt % P13-FSI + 1.0 mol/kg LiTFSI | | | | |
|---|---|---|---|---|
| | 30% | | 40% | |
| T/° C. | Cell 1 | Cell 2 | Cell 1 | Cell 2 |
| 22° C. | 1.0E−05 | 1.3E−05 | 3.5E−05 | 4.4E−05 |
| 32° C. | 2.8E−05 | 2.3E−05 | n.a. | n.a. |
| 40° C. | 4.8E−05 | 5.2E−05 | 1.4E−04 | n.a. |
| 50° C. | 7.0E−05 | 1.1E−04 | n.a. | 2.0E−04 |
| 40° C.$^a$ | 3.9E−05 | 6.1E−05 | n.a. | 1.6E−04 |
| 32° C. | 2.5E−05 | 3.6E−05 | n.a. | 1.2E−04 |
| 22° C.$^a$ | 9.2E−06 | n.a. | n.a. | 1.2E−04 | a: after 48 h, b: after 24 h
a: after 48 h, b: after 24 h

TABLE 3

| PEO-PDA + 30 wt % P13-FSI + 0.6 mol/kg LiTFSI | |
|---|---|
| 23 | 6.5E−06 |
| 32 | 2.2E−05 |
| 40 | 4.0E−05 |
| 50 | 7.2E−05 |
| 50 | 7.1E−05 |
| 40 | 3.4E−05 |
| 33 | 1.7E−05 |
| 21 | 8.8E−06 |

TABLE 4

| PEO-PMMA + 15 wt % P14TFSI + 0.6 mol/kg LiTFSI | |
|---|---|
| T/° C. | |
| 22 | 9.5E−05 |
| 33 | 1.9E−04 |
| 40 | 2.8E−04 |
| 50 | 5.0E−04 |

TABLE 5

| PEO-PMMA + 15 wt % P13FSI + 0.6 mol/kg LiFSI | |
|---|---|
| T/° C. | |
| 22 | 1.9E−05 |
| 34 | 5.0E−05 |
| 35 | 5.5E−05 |
| 40 | 7.6E−05 |
| 50 | 1.0E−04 |

TABLE 6

| PEO-PMMA + 15 wt % P13FSI + 1.0 mol/kg LiFSI | |
|---|---|
| T/° C. | |
| 22 | 1.8E−04 |
| 34 | 4.3E−04 |
| 40 | 5.0E−04 |
| 50 | 9.5E−04 |

Additional Information Relating to the Cyclability of the Polymeric Electrolyte in a Lithium Battery Under inert conditions, standard coin cells were assembled with lithium iron phosphate (LFP) cathode foil discs (10.5 mm diam.) and lithium metal foil discs (12 mm diam.) and a pre-fabricated ternary composite polymer membrane (14-15 mm diam.). The complete cells were rested for one day prior to commencing charge/discharge cycling on a battery test station (Maccor).

Clauses—Preferred Arrangements

1. A process for forming a conformal film of conducting polymer onto one or more surfaces of a substrate by polymerising onto the one or more surfaces in a single step one or more conducting polymer precursors including one or more monomers in the presence of conductivity enhancing additives comprising one or more ionic liquids and one or more optional ionic dopants.

2. The process of clause 1, wherein the conducting polymer precursors and the conductivity enhancing additives are simultaneously present at the substrate's surface when surface binding of the conformal polymer film onto the substrate surface take places.

3. The process of clause 1 or clause 2, wherein the conducting polymer precursors and conductivity enhancing additives are provided to the surface in the form of a single (one) solution comprising the one or more monomers, and the one or more optional ionic dopants, which may be dissolved or dispersed in the one or more ionic liquid.

4. The process of clause 3, wherein the single (one) solution consists essentially of: the one or more monomers, the one or more ionic liquids and the one or more optional ionic dopants.

5. The process of any one of the preceding clauses, wherein the ionic liquid:monomer concentration ratio is sufficient to solubilise the one or more monomers, and/or the optional one or more ionic dopants, when present.

6. The process of any one of the preceding clauses, wherein the liquid:monomer concentration ratio is such that substantially all of the ionic liquid and/or dopant is incorporated/entrained in the polymer, wherein preferably, at least 80-90%, and more preferably 90%-100% of the ionic liquid and/or dopant used becomes entrained within the polymer.

7. The process of any one of the preceding clauses, wherein the monomer is a diacrylate monomer, the ionic liquid concentration is up to 40 wt % (based on total amount of monomer and ionic liquid) or wherein the monomer is a monoacrylate, the ionic liquid concentration is up to 20 wt % (based on total amount of monomer and ionic liquid).

8. The process of any one of the preceding clauses, wherein the surface is a polarisable substrate capable of holding a charge when a suitable potential is applied thereto.

9. The process of any one of the preceding clauses, wherein the substrate is selected from the group consisting of: a metal, a metal alloy, a semi-conductor, an electrode or a material typically used in energy storage devices including batteries and capacitors, an electronically conducting polymer, such as polyaniline, polyacrylonitrile, polythiophene, polypyrrole, or derivatives thereof.

10. The process of any one of the preceding clauses, wherein the conducting polymer is surface bound to the substrate.

11. The process of clause 10 wherein the conducting polymer is surface bound to the substrate by polymerisation initiation on a polarised surface to which potential is applied via an electrografting process.

10. The process of any one of the preceding clauses, wherein the polymer is a solid ionically conducting polymer.

11. The process of any one of the preceding clauses, wherein the conformal film has a substantially uniform thickness that does not deviate from the mean thickness by any more than ±10% and/or the conducting polymer is substantially pin-hole free.

15. The process of any one of the preceding clauses wherein the conducting polymer is a homopolymer or a copolymer.

16. The process of any one of the preceding clauses wherein in addition to the one or more monomers, the one or more of the conductivity enhancing additives comprise at least one polymerisable functional group and/or one or more hydrophilic, hydrophobic, or other reactive groups, pH responsive groups, emissive, absorptive, fluorescent groups.

17. The process of clause 16, wherein the polymerisable functional group is selected from selected from the group consisting of acrylate, vinyl, styrene, acrylonitrile, olefin and/or other polymerisable groups which may be optionally substituted with groups such as alkyl groups, or one or more ionisable or cross linkable functional groups such as —COOH or —NH$_2$ 18. The process of any one of the preceding clauses wherein the ionic dopants are selected from ionisable compounds, including inorganic salts, such as metal salts, MX, where M is selected from the group consisting of Li, Na, K, Be, Mg, Ca, B, Al, and Zn; and where X is a negatively charged ion (anion) selected from the group consisting of: TFSI, FSI, PF$_6$, BF$_4$, CF$_3$SO$_3$, (Alkyl)BF$_3$, (Alkyl)$_n$B(CN)$_{4-n}$, where n is from to 4.

19. The process of any one of the preceding clauses wherein the one or more ionic liquids comprising an organic cation selected from the group consisting of: quaternary alkyl pyrrolidinium, alkyl piperidinium, alkyl ammonium, alkyl imidazolium, alkyl boronium, and alkyl phosphonium or any other cation which allows for battery operation; and organic anion selected from OTf, TFSI, FSI, or B(CN)$_4$.

20. A process for forming a solid polymer electrolyte onto one or more surfaces of a substrate comprising the steps of:
activating the surface of the substrate to facilitate formation of the polymer thereon, surface binding the polymer onto the surface by polymerising in a single step one or more solid polymer electrolyte precursors onto the modified substrate surface,
wherein the one or more polymer electrolyte precursors consisting essentially of one or more polymerisable monomers in one or more ionic liquid solvents and one or more ionic dopants.

21. A conducting polymer precursor solution for forming a conformal film of conducting polymer onto one or more surfaces of a substrate in a single step, the solution consisting essentially of one or more monomers, one or more ionic liquids, and optionally one or more ionic dopants being a metal salt.

22. A conducting polymer precursor solution according to clause 21, wherein the ionic liquid:monomer concentration ratio is sufficient to solubilise the one or more monomers, and/or the optional one or more ionic dopants, when present, yet is such that substantially all of the ionic liquid is incorporated/entrained in the polymer.

23. A product obtainable by the process of any one of clauses 20 to 22, preferably having an ionic conductivity of at least 1×10$^{-5}$ S/cm at ambient temperature.

24. An energy storage device comprising the product of clause 23 as an electrolyte and/or separator of a battery and/or a photovoltaic device.

25. The energy storage device of clause 25 wherein the device is a microbattery, for example, a Li polymer battery.

26. Use of the product of clause 23 or the energy storage device of clause 24 or 25 in an application selected from a coating application, membrane technology, corrosion or other protecting technologies, a microsensing application, for example, a wireless smart sensor for swarm sensing for environmental monitoring; biomedical applications including use as an artificial membrane and as a modified surface on a medical device and/or implant, preferable to increase biocompatibility and as a battery in medical implants requiring a power source; environmental applications; photovoltaic applications; as a dielectric material in electrochemical capacitors; as modified surfaces for chemical and electrochemical sensors and biosensors; fuel cells and electrolysis membranes; as a modified surfaces in microelectronics and MEMS industry; as a surface modifier for conducting glasses; as a surface modifier without the ionic dopant in general where ionic conduction is not required; in energy storage for microrobotics or for implantable devices; energy harvesting devices and microsupercapacitors, or in methods for method for applying an ionically conducting polymer to conductive surfaces.

The invention claimed is:

1. A self-limiting electrografting polymerization process for forming a covalently bonded conformal film of an electrically insulating solid ion conducting polymer onto a surface of an electrically conducting substrate, wherein the polymer has conductivity enhancing additives entrained therein, the process comprising the step of:
   initiating formation and surface binding of the polymer film by electrografting an initiator radical ion generated from electrochemically active monomers comprising acrylate groups terminating polyethylene glycol chains onto the surface of the substrate which is polarized at a potential between −1.5 and −3.5 V in a three electrode electrochemical cell whereby the substrate is configured as a working electrode substrate,
   wherein the formation and surface binding of the polymer is carried out by contacting an electrolyte in the form of a non-ionic liquid solvent free precursor solution with the polarised substrate, the solution consisting of:
      monomers; and
      conductivity enhancing additives consisting of:
         one or more ionic liquids having a cation selected from a quaternary alkyl pyrrolidinium, alkyl piperidinium, alkyl imidazolium, alkyl boronium, and alkyl phosphonium and an anion selected from OTf, TSFI, FSI, or $B(CN)_4$; and
         one or more ionisable salts comprising a cation selected from Li, Na, K, Be, Mg, Ca, B, Al, or Zn, charge balanced with an anion selected from TFSI, FSI, $PF_8$, $BF_4$, $CF_3SO_3$, $(Alkyl)BF_3$, or $(Alkyl)_nB(CN)_{4-n}$, where n is from 0 to 4;
   wherein ionic liquid is present in the precursor solution in an amount of up to 40 wt % of the monomer, provided the precursor solution is a homogenous solution of monomers, ionic liquids and ionisable salts, and
   wherein on formation, the surface of the polymer film is free of non-ionic liquid solvent and has a uniform thickness of between 1 nm to 1000 nm, the film not deviating from a film mean thickness by more than ±10%, and wherein the polymer film has 80 to 100% of the conductivity enhancing additives entrained therein.

2. The process of claim 1, wherein the potential is applied for a period of from 1 to 60 seconds.

3. The process of claim 1 wherein the working electrode substrate is a 3D surface with a high aspect ratio.

4. The process of claim 1 wherein the working electrode substrate is a pillared array in which the pillars are 10 microns in diameter, 10 microns apart and 100 microns long.

5. The process of claim 1, wherein the conformal film has an ionic conductivity of greater than $1 \times 10^{-5}$ S/cm at ambient temperature.

6. The process of claim 1, wherein the radical ion initiator is a radical ion formed from a one electron redox process which is oxidation or reduction involving monomer and/or other precursors present at the surface.

7. The process of claim 1, wherein a diameter of any pores within the film are smaller than the thickness of the film.

8. The process of claim 1 wherein the substrate is a metal, a metal alloy, a semi-conductor, an electrode for a battery, or an electronically conducting polymer.

9. The process of claim 1 wherein the substrate is a metal selected from the group consisting of: gold, platinum, lithium, sodium, magnesium, aluminium and tin, or a metal alloy selected from Cu/Sn, Li/Mg, or Mg/Si.

10. The process of claim 1, wherein the substrate is an electronically conducting polymer, comprising a polyaniline, polyacrylonitrile, polythiophene, polypyrrole, or derivatives thereof.

11. The process of claim 1, wherein the working electrode substrate is selected from graphite, Si, Sn, lithium titanate (LTO), Mg, Al, and alloys thereof.

12. The process of claim 1, wherein the electrochemical cell comprises a counter electrode comprising platinum or stainless steel.

13. The process of claim 1, wherein the electrochemical cell comprises a reference electrode comprising Ag/Ag+, Kalomel, or Pt.

14. The process of claim 1, wherein the monomer is polyethylene oxide diacrylate (PEO-DA), the working electrode is a Sn coated micropillar substrate, and the working electrode is polarized in the presence of the electrolyte at a potential of −2.5V for two minutes.

15. The process of claim 1, whereby the ionisable salt is lithium bis(trifluoromethanesulfonyl)imide (LiTFSI) or lithium bis(fluorosulfonyl)imide (LiFSI).

16. The process of claim 1, whereby the ionisable salt is present in an amount of 0.6 mol/kg to 1 mol/kg of the precursor solution.

17. The process of claim 1, wherein the ionic liquids are selected from 1-propyl-1-methyl pyrrolidinium bis(fluorosulfonyl)imide (P13FSI) and 1-butyl-1methyl pyrrolidinium bis(trifluoromethylsulfonyl)imide (P14TFSI).

18. The process of claim 1, wherein the ionic liquid is 1-methyl-1-propyl pyrrolidinium bis(fluorosulfonyl)imide (P13FSI) and 1-methyl-1-butyl pyrrolidinium bis(trifluoromethylsulfonyl)imide (P14TFSI), present in an amount of 15 wt %, 20 wt %, 30 wt %, or 40 wt % of monomer.

19. The process of claim 1, wherein the electrochemically active monomers comprising acrylate groups terminating polyethylene glycol chains are selected from diacrylate polyethylene glycol monomers or monoacrylate polyethylene glycol monomers.

20. The process of claim 1, wherein the electrochemically active monomers comprising acrylate groups terminating polyethylene glycol chains is selected from poly(ethylene glycol) diacrylate $M_{wt}$ 575 (PEO-DA575), poly(ethylene glycol) diacrylate $M_{wt}$ 700 (PEO-DA700), poly(ethylene glycol) methyl ether acrylate $M_{wt}$ 480 (PEO-MA480), and poly(ethylene glycol) methyl ether methacrylate $M_{wt}$ 500 (PEO-MMA500).

21. The process of claim 1, wherein the substrate is glassy carbon, graphite, Si, Si/C, lithium iron phosphate, lithium manganese oxide, lithium nickel manganese oxide, or lithium nickel cobalt manganese oxide.

22. A self-limiting electrografting polymerisation process for forming a covalently bonded conformal film of an electrically insulating solid ion conducting polymer onto a surface of an electrically conducting 3D microstructured substrate, wherein the polymer has conductivity enhancing additives entrained therein, the process comprising the step of:

initiating formation and surface binding of the polymer film by electrografting an initiator radical ion generated by electrochemically active monomers comprising acrylate groups terminating polyethylene glycol chains selected from diacrylate polyethylene glycol monomers or monoacrylate polyethylene glycol monomers onto the surface of the substrate which is polarised at a potential between −1.5 and −3.5 V in a three electrode electrochemical cell whereby the substrate is configured as a working electrode substrate, wherein the formation and surface binding of the polymer is carried out by contacting an electrolyte in the form of a non-ionic liquid solvent free precursor solution with the polarised substrate, the solution consisting of a homogenous solution of:

monomers; and conductivity enhancing additives consisting of: ionic liquids selected from 1-methyl-1-propyl pyrrolidinium bis(fluorosulfonyl)imide (P13FSI) and 1-methyl-1-butyl pyrrolidinium bis(trifluoromethylsulfonyl)imide (P14TFSI), in an amount of up to 40 wt % of the monomer, provided the precursor solution is a homogenous solution of monomers, ionic liquids and ionisable salts selected from the group consisting of LiFSI and LiTFSI in an amount of 0.6 mol/kg or 1.0 mol/kg, and wherein on formation, the surface of the polymer filing is free of non-ionic liquid solvent and has a uniform thickness of between 1 nm to 1000 nm, the film not deviating from a film mean thickness by more than ±10%, and wherein the polymer film has from 80 to 100% of the conductivity enhancing additives entrained therein.

\* \* \* \* \*